(12) United States Patent
Higaki et al.

(10) Patent No.: US 6,605,179 B1
(45) Date of Patent: Aug. 12, 2003

(54) METHOD AND APPARATUS FOR BONDING OPTICAL DISK SUBSTRATE

(75) Inventors: Norihide Higaki, Ibaraki (JP); Koji Matsunaga, Katano (JP); Keinosuke Kanashima, Osaka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/382,831

(22) Filed: Aug. 25, 1999

(30) Foreign Application Priority Data

Aug. 26, 1998 (JP) .......................... 10-239792

(51) Int. Cl.[7] .............................. G11B 7/26
(52) U.S. Cl. ................. 156/379.8; 156/443; 156/498; 156/583.91
(58) Field of Search ............... 250/504 R; 156/379.6, 156/379.8, 443, 497, 498, 581, 583.1, 583.91, 275.7, 282

(56) References Cited

U.S. PATENT DOCUMENTS

| 5,785,793 A | * | 7/1998 | Arai et al. ............. 156/379.6 |
| 5,916,398 A | * | 6/1999 | Coleman et al. ........ 156/275.7 |
| 5,932,042 A | * | 8/1999 | Gensel et al. ............. 156/74 |
| 6,042,684 A | * | 3/2000 | Ohman .................. 156/275.7 |
| 6,191,428 B1 | * | 2/2001 | Gilberti ................. 250/504 R |

FOREIGN PATENT DOCUMENTS

| JP | 05114174 A | * | 5/1993 | .......... B29C/41/20 |
| JP | 7-282474 | | 10/1995 | |
| JP | 08087779 A | * | 4/1996 | .......... G11B/7/26 |
| JP | 9-115192 | | 5/1997 | |
| JP | 9-265675 | | 10/1997 | |
| JP | 9-320130 | | 12/1997 | |
| JP | 10-112081 | | 4/1998 | |
| JP | 10-199053 | | 7/1998 | |

* cited by examiner

Primary Examiner—Michael W. Ball
Assistant Examiner—John T. Haran
(74) Attorney, Agent, or Firm—Wenderoth, Lind & Ponack, L.L.P.

(57) ABSTRACT

A method and an apparatus for bonding optical disk substrates, includes placing a pair of optical disk substrates on a stage while securing a height difference at an upper face of the stage loading the substrates between an upper face at a side of a center of the substrates and an upper face at a side of an outer circumference of the substrates. The method and the apparatus also includes photosetting the adhesive layer on the stage by irradiating a setting light to the substrate pair, thereby photosetting the adhesive layer and bonding the substrates.

4 Claims, 15 Drawing Sheets

METHOD AND APPARATUS FOR BONDING OPTICAL DISK SUBSTRATE

BACKGROUND OF THE INVENTION

The present invention relates to a method and an apparatus for bonding optical disk substrates, and more particularly, a method and an apparatus for bonding substrates in pairs to be optical disks by setting with light via a photosetting type adhesive, thereby manufacturing bond type optical disks utilized for DVDs (Digital Versatile Disks), etc.

Techniques are known whereby a plurality of substrates having recording layers are bonded each other thereby constituting optical disks for DVDs, so that multilayer recording is achieved.

The Applicant already proposed techniques related to the bond method and apparatus as disclosed in Japanese Patent Application Nos. 8-73536 and 8-89243.

Specifically, according to the proposal, an adhesive of a type set with ultraviolet rays or the like type is injected to a gap of a pair of substrates facing each other via the relatively small gap. The adhesive is spread to the entirety of the gap, whereby a layered body comprising the pair of substrates and the intermediate adhesive layer is obtained. With the projection of ultraviolet rays to the layered body or by the like manner, the adhesive is set and the substrates are bonded to each other.

In order to read stored data on or write data to an optical disk, a laser light is used. The laser light is projected from outside of the optical disk while the optical disk rotates at high speed. The laser light passing through the transparent substrate of the optical disk is irradiated onto a recording layer. At this time, the laser light is required to be correctly shed onto a predetermined position of the recording layer because the optical disk has a considerably high recording density. Meanwhile, it is impossible to focus the laser light correctly on the predetermined position of the recording layer if the recording layer and the whole optical disk show a poor degree of flatness. Thus, information errors can easily occur.

Under the circumstances, a high degree of flatness with no warp or distortion is required to be maintained in the manufacture process of the optical disk.

However, optical disks of the aforementioned bond type, more strictly, disk substrates tend to warp, thereby decreasing the degree of flatness when the adhesive is being set with light.

The reason is the heat generated by an ultraviolet projection lamp used in setting the adhesive. A material of the optical disk is expanded by the heat at the projection of light, then shrunken and returned to an initial state subsequent to cooling, upon completion of the photosetting process. The expansion and shrinkage by the heating and cooling takes place in an unbalanced state between the material at the side close to the lamp and the material at the side away from the lamp, thereby causing the optical disk to warp. The substrate of the optical disk close to the ultraviolet projection lamp has a larger quantity of heat generated thereon because of a larger quantity of light projected thereto and therefore expands greatly, whereas the substrate opposite to the above substrate via the adhesive has a smaller quantity of heat generated thereon and expands less. When the adhesive is completely set in this state with a difference in expansion amount between the substrates, the cooling makes the substrate close to the projection lamp which has expanded more shrink more than the other substrate and consequently the optical disk is deformed to warp towards the projection lamp due to a shrinkage stress.

The deformation to the optical disk is caused by reasons other than the above. For instance, the optical disk is deformed through the expansion and shrinkage process at the time of setting the adhesive, which practically originates from thermal deformation, etc. and an imbalance in material structure brought about in the photosetting process or production process prior to the photosetting process. The deformation presents not only a uniform warp from the center to the outer circumference, but can also cause local unevenness or swell in radial and circumferential directions within a plane.

Temperatures of base materials and apparatuses handling the substrates change with time in a production line where optical disks are produced continuously, sometimes causing an influence on temperature, and the expansion and shrinkage of substrates. Moreover, changes in temperature, and expansion and shrinkage of the substrates are influential to a deformation amount of the optical disk. Particularly for a while when the production line starts to operate after a pause, a temperature condition within the production apparatus is not stable and therefore, the deformation amount of the optical disk is apt to vary.

Environmental conditions where the optical disk is handled also influences the generation of the deformation. For example, a change in humidity influences the expansion and shrinkage. The influence is large when a humidity-absorbing synthetic resin is used as the substrate material.

The object of the present invention is therefore to provide a method and an apparatus for bonding optical disk substrates capable of obtaining optical disks with a good degree of flatness by preventing the optical disks from being deformed, for example, warped, when manufactured through bonding disk substrates.

SUMMARY OF THE INVENTION

In order to achieve the aforementioned objective, the present invention provides a method and an apparatus for bonding optical disk substrates, whereby a setting light is projected to a pair of optical disk substrates having a photosetting adhesive layer interposed therebetween, thereby photosetting the adhesive layer and bonding the substrates. According to the present invention, a device is arranged for preventing optical disk substrates from being deformed when the adhesive layer is set with light.

In accomplishing these and other aspects, according to a first aspect of the present invention, there is provided a method for bonding optical disk substrates. The method comprises placing a pair of optical disk substrates on a stage while securing a height difference at an upper face of the stage loading the substrates between an upper face at a side of a center of the substrates and an upper face at a side of an outer circumference of the substrates, and photosetting the adhesive layer on the stage by irradiating a setting light to the substrate pair, thereby photosetting the adhesive layer and bonding the substrates.

According to a second aspect of the present invention, there is provided a method for bonding optical disk substrates according to the first aspect, wherein in the photosetting, warp deformation caused when the substrate pair finishes the photosetting operation is offset by deforming the substrate pair tracing the height difference at the upper face of the stage because of a weight of the substrate pair.

According to a third aspect of the present invention, there is provided a method for bonding optical disk substrates according to the first aspect, wherein the height difference of the stage is realized by a step whereby the substrates are made higher at the center than at the outer circumference.

According to a fourth aspect of the present invention, there is provided a method for bonding optical disk substrates according to the first aspect, wherein the height difference of the stage is realized by a taper, whereby the substrates are lowered from the center to the outer circumference.

According to a fifth aspect of the present invention, there is provided a method for bonding optical disk substrates according to the first aspect, the method further comprising controlling temperature of at least a front surface side one of the substrates thereby reducing a temperature difference between both faces of the substrate pair when the adhesive layer is photoset.

According to a sixth aspect of the present invention, there is provided a method for bonding optical disk substrates according to the first aspect, the method further comprising making a temperature distribution of the substrates uniform in a plane direction through controlling temperature of the substrates when the adhesive layer is photoset.

According to a seventh aspect of the present invention, there is provided a method for bonding optical disk substrates according to the first aspect, wherein in the photosetting, the setting light is irradiated in a step of temporarily setting the adhesive layer with a lower quantity of light than required for completely setting the adhesive layer and a succeeding step of practically setting the adhesive layer with the required quantity of light for completely setting the adhesive layer.

According to an eighth aspect of the present invention, there is provided a method for bonding optical disk substrates according to the first aspect, the method further comprising controlling a humidity of the substrate pair when the adhesive layer is photoset.

According to a ninth aspect of the present invention, there is provided an apparatus for bonding optical disk substrates, the apparatus comprising a stage on which a substrate pair comprising optical disk substrates in a pair with a photosetting adhesive layer placed in between, when the adhesive layer is to be photoset, the stage securing a height difference at an upper face of the stage loading the substrates between an upper face at a side of a center of the substrates and an upper face at a side of an outer circumference of the substrates, and a light source for irradiating a setting light to the substrate pair, thereby photosetting the adhesive layer and bonding the substrates.

According to a 10th aspect of the present invention, there is provided an apparatus for bonding optical disk substrates, according to the ninth aspect, wherein the stage comprises a spacer disposed detachably to the stage at a side of a center of the substrate pair and projecting from a front face of the stage.

According to an 11th aspect of the present invention, there is provided an apparatus for bonding optical disk substrates according to the 10th aspect, wherein a projection amount of the spacer from the front face of the stage is adjustable.

According to a 12th aspect of the present invention, there is provided an apparatus for bonding optical disk substrates according to the ninth aspect, wherein the stage comprises a front face thereof which is tapered to be gradually lower from the center of the front face to an outer circumference of the front face.

According to a 13th aspect of the present invention, there is provided an apparatus for bonding optical disk substrates according to the 9th aspect, the apparatus further comprising a temperature control device for adjusting a surface temperature of the stage.

According to a 14th aspect of the present invention, there is provided an apparatus for bonding optical disk substrates according to the 13th aspect, wherein the temperature control device comprises a temperature control medium passage built in the stage, and a medium feed device for feeding a temperature control medium to the passage.

According to a 15th aspect of the present invention, there is provided an apparatus for bonding optical disk substrates according to the ninth aspect, the apparatus further comprising a shutter part set between the substrate pair and a light source for irradiating the setting light to the substrate pair, for controlling the passing of the setting light.

According to a 16th aspect of the present invention, there is provided an apparatus for bonding optical disk substrates according to the 15th aspect, wherein the shutter part comprises a shielding member for shielding the setting light so as to not pass, a light-passing space set at part of the shielding member to permit the setting light to pass, and a shielding member driving device for selectively arranging the light-passing space at a position corresponding to the substrate pair and a position shifted from the substrate pair.

According to a 17th aspect of the present invention, there is provided an apparatus for bonding optical disk substrates according to the 16th aspect, wherein the shielding member is constituted of a pair of shielding members each having the light-passing space opened at one side end opposite to the counterpart shielding member, and the shielding member driving device has an interlocking reciprocation device for reciprocating the pair of shielding members interlockingly in opposite directions to each other.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
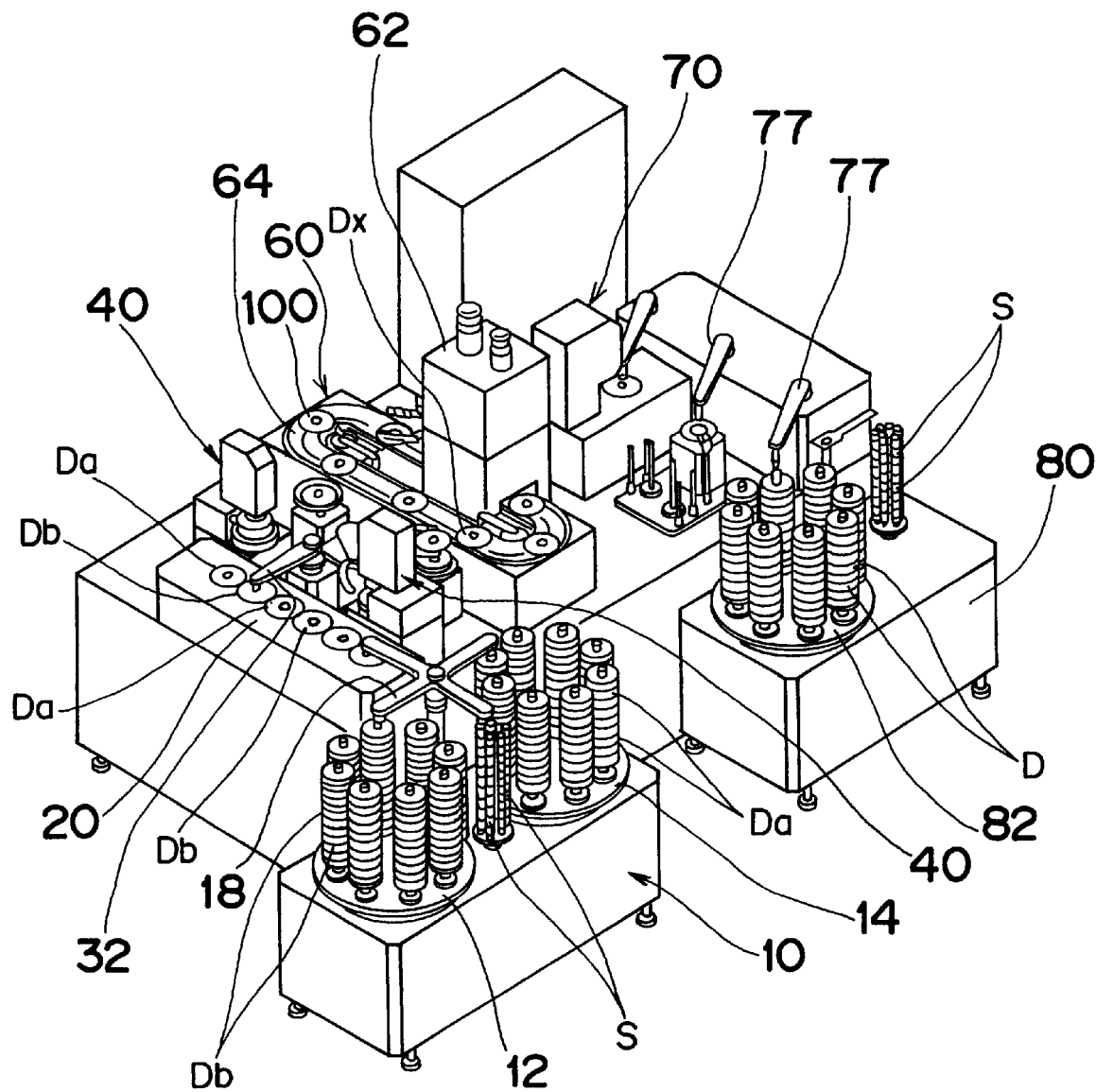
FIG. 1 is a schematic perspective view showing a total structure of a bonding apparatus according to a first embodiment of the present invention.

Before the description of the present invention proceeds, it is to be noted that like parts are designated by like reference numerals throughout the accompanying drawings.

Before methods and apparatuses for bonding optical disk substrates according to embodiments of the present invention are specifically described with respect to the drawings, the schematic features of the embodiments of the present invention is firstly described below.

OPTICAL DISK

The present invention is applied to various optical disks such as DVDs, CDs, PDs (Phase change rewritable optical Disks), LDs, etc., that is, bond type optical disks each comprising a plurality of substrates bonded to one another. The bond type optical disks are classified into two types, one that has a single recording layer and the other that has a plurality of recording layers.

SUBSTRATE

In conformity with use purposes, substrates, e.g. single sheets or plates for DVDs, are formed of a suitable combination of synthetic resin, metallic thin films, and other materials. The DVD has a disk main body of transparent resin such as polycarbonate resin or the like, and a recording layer having a metallic thin film or the like on which is disposed projections and recesses for recording on one face of the disk main body. A protecting film is sometimes formed on a front face of the recording layer. Generally the face where the recording layer is arranged is made a bond face.

Substrates to be bonded can be formed of the same material in the same structure or of different materials or in different structures. A pair of substrates to be bonded are generally different in structure at least at recording layers. For example, upper substrates may be formed of polycarbonate resin with gold thin film and lower substrates may be formed of polycarbonate resin with aluminum thin film. The recording layer may be eliminated from either one of the pair. The substrate is a thin disk-shaped sheet or plate in the DVD, but may be a different shape other than the circular sheet depending on the usage. The shape of the substrates may be processed after the bonding.

A set condition for a means for preventing the deformation, for example, a stage height, a temperature control condition to substrates, etc. to be described later, may be changed in accordance with the material and structure of the substrates.

ADHESIVE

Various kinds of photosetting adhesives may be used to match the material and usage of the substrates to be bonded. Although a transparent adhesive capable of being set with ultraviolet rays is preferred for the DVD, an adhesive capable of being set with light of a wavelength other than a wavelength of the ultraviolet rays is also utilizable in the present invention. That is, the photosetting adhesive according to the present invention includes adhesives capable of being set with lights of various wavelengths including ultraviolet rays and radioactive rays.

PRODUCTION OF SUBSTRATE PAIR

A general production technique for bond type optical disks is applicable to a method and an apparatus for producing pairs of substrates wherein each of the substrate pairs is produced by interposing an adhesive layer between a pair of substrates.

For instance, the following method is applied.

While a pair of substrates are held facing each other with a relatively narrow gap in between, an adhesive injection nozzle is inserted into the gap and the adhesive is discharged from the injection nozzle. At this time, the pair of substrates are rotated in a plane direction, that is, in a direction around a rotary axis of the substrates, so that the adhesive is discharged in a loop in the gap on the substrates. Thereafter, the gap between the substrates is narrowed by relatively moving one or both of the substrates and at the same time rotating the substrates, whereby the looped adhesive spreads in a radial direction and fills the small gap between the substrates. The technique is disclosed concretely in a detailed manner in Japanese Patent Application Nos. 8-73536, 8-89243 referred to earlier, and others.

Since the adhesive is not yet set at this point in time, the pair of substrates are required to not shift from each other, nor to allow the adhesive to protrude from the edge when the substrates are sent to a succeeding photosetting process. Preferably, the substrates, in pairs, are held in a state in which the substrates maintain a horizontal attitude and are handled in this state, i.e. horizontally, while only one substrate at the bottom side is held generally. When a supporting member is inserted into a center hole of the DVD penetrating the center of the substrate pair, the substrates are prevented from shifting from each other.

PHOTOSETTING

A general production technique for optical disks is substantially satisfactorily applied as a method and an apparatus for setting the adhesive layer with light so long as a setting light necessary for setting the adhesive layer is obtained.

Generally, a light projection lamp is arranged above the pair of substrates placed horizontally on a flat stage. A light projected from the light projection lamp is passed through the transparent upper substrate to reach the adhesive layer, whereby the adhesive is set.

DEFORMATION PREVENTION MEANS OR DEVICE; MEMBER FOR PROVIDING HEIGHT DIFFERENCE TO STAGE

As a first example of the deformation prevention means or device, a member for providing a height difference is placed on the stage so as to form a height difference which is provided between the center and the outer circumference of an upper face of the stage loading the substrate pair thereon.

When placed on the stage having the height difference, the substrate pair is deformed, tracing from a higher part to a lower part of the stage because of its weight so as to correct the warp deformation of the substrates. This correction deformation of the substrate pair is designed to counteract the warp deformation caused in the substrate pair, thus offsetting the warp deformation when the substrate pair, namely, the optical disk finishes the photosetting process. Accordingly, an optical disk with a high degree of flatness and with reduced deformation is obtained.

The height difference of the stage is preferably set so that the center is high and the outer circumference is low. As described before, the warp deformation in the photosetting process generally takes place in a direction towards the ultraviolet projection lamp disposed at the opposite side to the stage with respect to the substrate pair, and therefore the correction deformation is preferably directed in the direction opposite to the warp deformation.

For providing the height difference to the stage, a front face of the stage is tapered, generally preferably tapered in a circular cone which is gradually lowered in a radial direction from the center to the outer circumference. An inverse taper gradually lowered from the outer circumference to the center may be formed depending on a state of the warp deformation of the optical disk. The taper is formed at the whole face of the stage in touch with the substrate pair or only partly where the correction deformation is required, and also, an angle of the taper may be changed at each point.

The taper may be preferably set to a specific amount by detecting the amount of the warp deformation of the optical disk from experiments or trial. In the DVD, for example, a height difference of 0.1–0.35 mm is allowable between a position corresponding to an inner circumferential edge and a position corresponding to an outer circumferential edge.

As another way to provide the height difference to the stage, a step may be set at the front face of the stage. Similar to the taper, the step is generally preferably formed to make the center of the substrate pair higher than the outer circumference. The amount of the step is set in a similar manner to the taper amount. The step may be a single step or may comprise a plurality of steps.

The step may be formed by processing the front face of the stage. Alternatively, a spacer can be arranged to obtain the step.

The spacer is a doughnut-shaped sheet, adjusting the step amount by a thickness thereof. The spacer when detachably set to the stage is exchangeable with another spacer of a different height upon necessity. The spacer is simply placed on the stage or fixed by bolts and metal fittings. Or, a disk-like spacer may be fitted to a center shaft of the stage to make the center of the stage higher, thereby constituting the step. The spacer may be set on the flat stage. Instead of setting the spacer on the flat stage, a groove can be formed at part of the stage and the spacer can be fitted in the groove to partly project up from the front face of the stage.

A projection amount of the spacer from the front face of the stage is made adjustable. More specifically, the projection amount of the spacer set to the stage is adjusted with the use of a position adjustment mechanism of screws, cams, etc. An adjustment range of the projection amount is kept in the aforementioned preferable range of the step amount or taper amount.

DEFORMATION PREVENTION MEANS OR DEVICE: CONTROLLING FRONT-REAR FACE TEMPERATURE DIFFERENCE

As a second example of the deformation prevention means or device, a temperature of at least the front face-side substrate of the substrate pair is controlled, thereby decreasing a temperature difference between both faces of the substrate pair.

As described earlier, the warp deformation of the optical disk results from a difference of thermal expansion amounts between the front and rear faces of the substrate pair. The difference of the thermal expansion amounts is lessened if the temperature difference between the front and rear faces of the substrate pair is reduced, so that the warp deformation is restricted.

The substrate at the side where the photosetting light is irradiated in the substrate pair is heated more by the lamp and increased in temperature, and the opposite side is relatively low in temperature. Therefore, the temperature difference can be reduced by cooling the side when the photosetting light is irradiated or heating the opposite side.

A device for blowing a cold wind is utilizable to cool the side where the photosetting light is irradiated. A hot wind is blown or a heating member may be brought in touch to heat the opposite side. In the case where the photosetting light is projected to the substrate pair on the stage from the rear side of the stage, the front face of the stage is heated or cooled, whereby a contact face of the substrate pair to the stage is heated or cooled.

A temperature control medium passage may be installed in the stage as a device for controlling the temperature and, a medium feed device for feeding a temperature control medium to the passage is provided.

The temperature control medium is a fluid that can be heated and cooled, for example, the air, water, oil, etc., and fed or circulated by a pump, blower, or the like to the temperature control medium passage constituted of an internal conduit or a space inside the stage.

Depending on the reason for the deformation of the optical disk, the substrate at the side where the photosetting light is irradiated may be heated or the opposite side may be cooled.

DEFORMATION PREVENTION MEANS OR DEVICE: UNIFORMING TEMPERATURE DISTRIBUTION

As a third example of the deformation prevention means, a method of controlling the temperature of the substrate pair thereby uniforming a temperature distribution in the plane direction of the substrate pair is adoptable. An unequal temperature distribution in the plane direction of the substrate pair leads to distortion deformation totally or locally in the plane direction. Therefore, making the temperature distribution uniform can prevent the above deformation.

When the above-described temperature control device for lessening the temperature difference of both faces of the substrate pair also performs a function of making the temperature distribution uniform in the plane direction, this temperature control device can be used for both purposes.

Meanwhile, when the temperature control medium passage of the temperature control device utilizing the temperature control medium is installed properly, the temperature distribution at the front face of the stage is efficiently uniform. In the event that the conduction of heat from outside, namely, supply of heat happens to cause temperature imbalance at points of the substrate pair, it is effective to cool the substrate pair thereby getting rid of the heat corresponding to the heat conducted from out-side.

Either one of a plurality of methods is employed to make the temperature distribution uniform, i.e. a method of heating the substrate pair to set the whole substrate pair at a constant temperature, or a method of cooling the substrate pair thereby setting the whole substrate pair at a constant temperature.

A heat uniforming body may be arranged at the front face of the stage in touch with the substrate pair so as to make the temperature distribution uniform. The heat uniforming body is formed of material with a high conductivity in the plane direction, for example, carbon graphite, etc.

DEFORMATION PREVENTION MEANS OR DEVICE: CONTROLLING HUMIDITY

As a fourth example of the deformation prevention means or device, a humidity of the substrate pair can be controlled when the adhesive layer is set with light. This arrangement is effective to prevent generation and dispersion of the deformation as a result of humidity absorption or humidity change of the substrate pair.

To control the humidity, the whole ambience in which the photosetting process is carried out is maintained in a constant humidity condition range with the use of an apparatus capable of controlling a humidity environment, for instance, an air conditioner, etc.

The humidity condition is preferably set to keep a humidity close to that when the substrates are molded. More specifically, the humidity is not larger than 60%, preferably not larger than 40%. A humidity change with time is preferred to be lessened.

DEFORMATION PREVENTION MEANS OR DEVICE: PHOTOSETTING IN PLURALITY OF STAGES

As a fifth example of the deformation prevention means or device, the setting light can be projected in a plurality of steps. Specifically, the projection is conducted including a temporary setting step of projecting a smaller quantity of light than that required for completely setting the adhesive layer, thereby temporarily setting the adhesive layer, and a succeeding step of projecting the required quantity of light for completely setting the adhesive layer, thereby completely setting the adhesive layer.

The adhesive layer is set in the temporary setting step with a level of flexibility or deformability ensured, so that the adhesive layer does not move or is not deformed unexpectedly, but the thermal deformation of the substrate pair subsequent to the projection of the setting light can be absorbed in the cooling process. That is, the warp deformation of the substrates are determined by the temporary setting step. Thus, the division of the temporary setting step and the complete setting step allows the warp deformation of the substrates to be reduced, as compared with a case where only one setting step is carried out.

The pair of substrates after finishing the temporary setting step shrinks in the cooling process and is returned to the original flat state.

In the complete setting step, the adhesive layer is perfectly set thereby bonding the substrates at both sides. Since the adhesive layer is set to a certain degree in the temporary setting step, a relatively slight quantity of light or a short-time projection of light is enough to perfectly set the adhesive layer. Accordingly, the substrate pair receives less heat in the complete setting step and the deformation subsequent to the expansion and shrinkage is restricted.

The temporary setting step can be further divided to a plurality of steps.

In order to control the quantity of the setting light projected to the substrate pair in the temporary and complete setting steps, timing for turning on and off the light source opposed to the substrate pair are controlled. However, the ultraviolet projection lamp or the like light source is hard to turn on and off in a time period shorter than several seconds to one second which is necessary to distinguish the temporary setting step and the complete setting step from each other.

As such, instead of controlling the timing, the substrate pair may be adapted to traverse at high speed a projection range of the light source kept on at all times at a constant position, whereby the quantity of the setting light is controlled. The quantity of light projected to the pair of substrates is adjustable by controlling a traverse speed of the substrates.

SHUTTER PART

A shutter part is employable as a different way to control the quantity of light.

The shutter part is arranged between the light source for emitting the setting light and the substrate pair to control a passing time of the setting light.

Concretely, the shutter part is constituted in the same structure as a shutter mechanism of various optical apparatuses used for controlling the quantity of light.

For example, the shutter part comprises a shielding member for hindering the setting light from passing through, a light-passing space provided at a part of the shielding member to let the setting light pass through, and a shielding member driving device for selectively positioning the light-passing space at a position corresponding to the substrate pair and at a position separated from the substrate pair.

The light-passing space can be provided to correspond to a shape of the substrate pair to which the light is projected. That is, a circular light-passing space is adopted when the substrates are disk-shaped.

A driving mechanism used in various mechanical apparatuses is applied as an example of the shielding member driving device, which is constituted of a combination of a cylinder mechanism, a cam mechanism, a rack mechanism, a ball-screw mechanism, a link mechanism, etc.

As mentioned earlier, the passing time of the setting light in the temporary and complete setting steps is required to be correctly controlled to be, for example, smaller than one second. Therefore, the shielding member driving device is preferably constituted of a mechanism capable of operating quickly and correctly.

In order to fulfill the function of controlling the passing time of the setting light correctly and quickly, the shielding member can include a pair of shielding members which form a light-passing space for passing the setting light at respective ends with one side of the space opened, and the shielding member driving device may be provided with a reciprocation interlocking device for reciprocating the pair of shielding members in opposite directions interlockingly.

At one end of reciprocation of the pair of shielding members, the shielding members form a light-passing space which shape corresponds to the substrate pair by the light-passing spaces of the pair of shielding members at respective ends. For example, the pairing shielding members each having a semicircular space present a circular light-passing space when combined with each other. At the other end of the reciprocation, the light-passing spaces of the shielding members are shifted from the substrate pair and the shielding members shut out the light and prevent it from passing through. As compared with a single shielding member, the pair of shielding members can shorten a reciprocation distance, thus achieving quick action with ease.

An interlocking mechanism used in general mechanical apparatuses, for example, a gear mechanism, a cam mechanism, etc. is employed to interlock the reciprocation of the pair of shielding members.

COMBINATION OF DEFORMATION PREVENTION MEANS OR DEVICES

Although the aimed function is achieved with the use of the single deformation prevention means or device described hereinabove, superior prevention efficiency is achieved if two or more means or devices are used together.

For instance, forming the stepped portion with the spacer and dividing the photosetting process into the plurality of steps can be carried out in combination. Further, making the temperature distribution uniform or controlling the humidity may be added to the above.

WHOLE STRUCTURE OF BONDING APPARATUS

A bonding apparatus according to a first embodiment of the present invention shown in FIG. 1 is used to manufacture DVDs. The apparatus can carry out a bonding method of the first embodiment. Substrates Da and substrates Db are used to constitute optical disks. Both substrates Da, Db are formed of transparent polycarbonate resin fundamentally in a common shape, while recording layers are formed of different materials in different structures.

The bonding apparatus has a substrate pile part 10 where the substrates Da, Db are piled, an alignment transfer part 20 for aligning and transferring the substrates Da, Db, bond parts 40 for respectively bonding the substrates Da, Db with an adhesive, for example, an acrylic adhesive, a photosetting part 60 for setting the adhesive with ultraviolet rays, an inspection part 70 for inspecting manufactured optical disks, and an optical disk collection part 80 where optical disks are piled.

The substrates Da, Db piled on turntables 14, 12 at the substrate pile part 10 are alternately taken out by a crossed turning arm 18 and sent to the alignment transfer part 20 in a state in which the substrates are aligned. At this time, the arm 18 is reciprocally rotated by 90 degrees. The substrates Da, Db are alternately taken out by a turning arm 32 at an end part of the alignment transfer part 20 and sent to each of the bond parts 40 in a state while the substrates Da, Db face each other. At the bond part 40, an adhesive is supplied to between the substrates Da and Db in a pair, whereby a substrate pair Dx composed of the substrates Da, Db and the adhesive layer interposed therebetween is obtained.

The substrate pair Dx is transferred to an elliptical conveyor 64 of the photosetting part 60 and sent to an ultraviolet irradiation part 62.

When ultraviolet rays are projected at the ultraviolet irradiation part 62 thereby photosetting the adhesive, an optical disk D is completed. After finishing a product inspection at the inspection part 70, the optical disks are sequentially transferred by transfer arms 77 and piled on a turntable 82 of the optical disk collection part 80.

BONDING PROCESS

Bonding is carried out in processes (A)–(D) in FIGS. 2A–2D.

PROCESS (A)

Figure 2A:
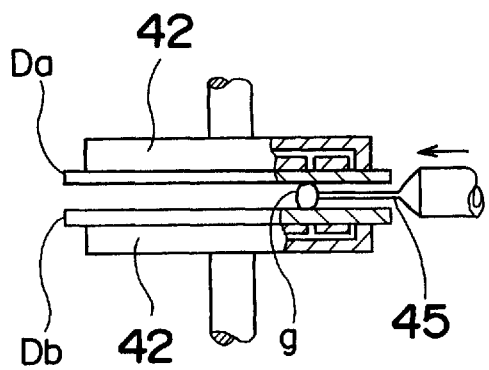
FIGS. 2A, 2B, 2C, and 2D are diagrams showing step by step a bonding process of a bonding method according to the first embodiment of the present invention.

As shown in FIG. 2A, at the bond part 40, the substrates Da, Db are vacuum-sucked and held at upper and lower rotary holding panels 42 faced to each other.

A discharge nozzle 45 proceeds in a direction from the outer circumference to the center of the substrates Da, Db. An adhesive g is discharged from a leading end of the discharge nozzle 45.

PROCESS (B)

Figure 2B:
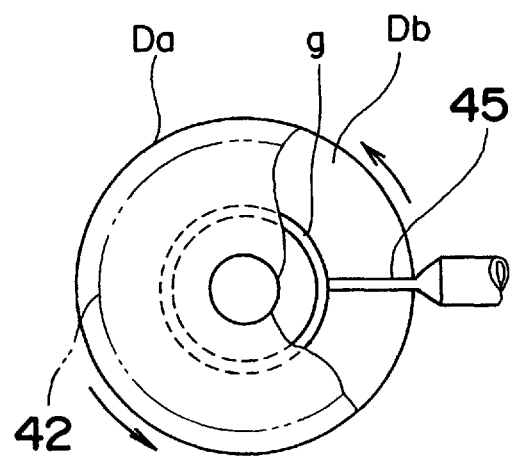

As shown in FIG. 2B, while the adhesive g is discharged from the discharge nozzle 45, the substrates Da, Db are rotated together with the rotary holding panels 42. As a result, the adhesive g is expanded in a circumferential direction and forms a loop.

PROCESS (C)

Figure 2C:
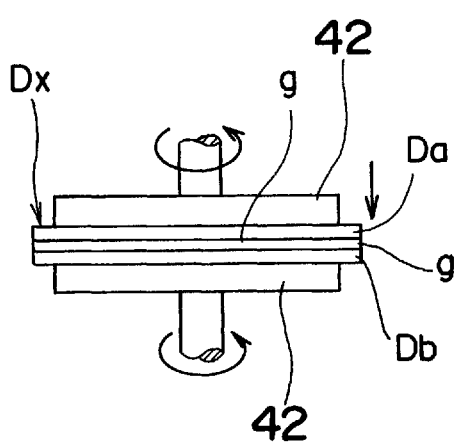

As shown in FIG. 2C, the discharge nozzle 45 retreats and the rotary holding panels 42, 42 move close to each other, thereby narrowing a gap between the substrates Da and Db. In this state, the substrates Da, Db are rotated along with the rotary holding panels 42, whereby the adhesive g is spread all over the confronting faces of the substrates Da, Db, forming an adhesive layer g of a constant thickness. The substrate pair Dx is thus constituted.

PROCESS (D)

Figure 2D:
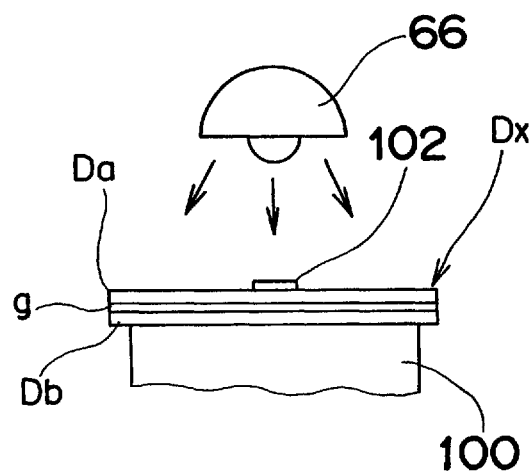

As shown in FIG. 2D, the substrate pair Dx is taken out of each of the bond parts 40 and sent to the photosetting part 60.

The substrate pair Dx is loaded on a stage 100 at the photosetting part 62. A center hole of the substrate pair Dx is fitted in a core shaft 102 projecting from the center of the stage 100, so that the substrate pair is positioned in a horizontal direction.

The ultraviolet projection lamp, namely, a light source 66 installed above the stage 100 projects light to set the adhesive g of the substrate pair Dx. The upper and lower substrates Da, Db are bonded accordingly.

SPACER

Figure 3:
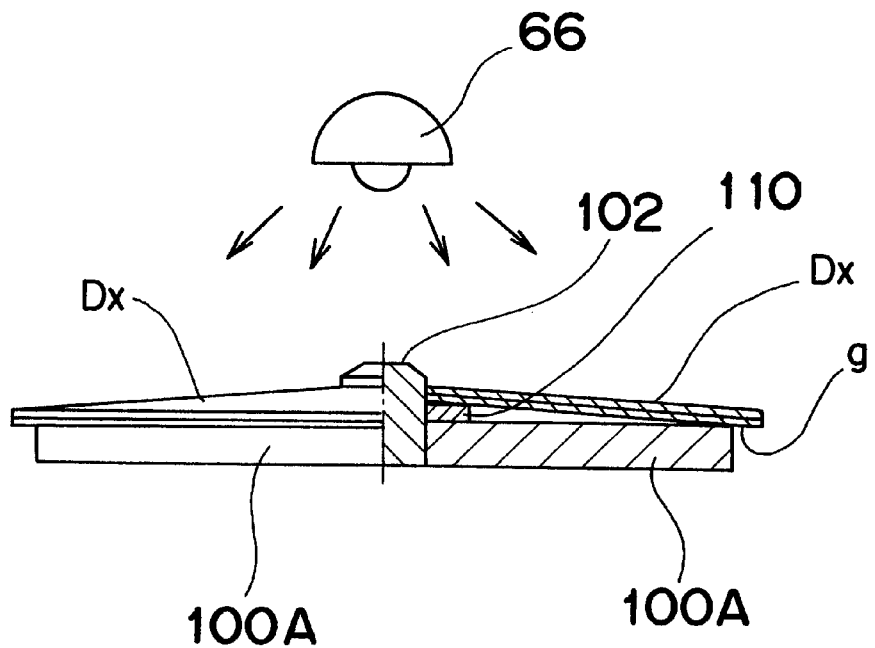
FIG. 3 is a half sectional view of a photosetting process using a stage with a spacer in the apparatus and method of the first embodiment.

In the bonding apparatus of the first embodiment, as shown in FIG. 3, a spacer 110 is set at a flat surface of the stage 100A.

The spacer 110 is a doughnut-shaped circular plate detachably fitted at the center shaft 102 at the center of the stage 100A. A height of the spacer 110 is set in a range of 0.1–0.35 mm, for example, 0.25 mm in the first embodiment.

The substrate pair Dx placed on the stage 100A maintains a shape as when loaded on the spacer 110. That is, an outer circumferential part of the substrate pair Dx not supported by the spacer 110 hangs down because of its weight, and therefore the substrate pair Dx slopes downwards from a central part to the outer circumferential part of the substrate pair Dx.

When the light source 66 projects light, the substrate pair Dx is heated, raised in temperature, and thermally expanded in a direction towards the outer circumference of the substrate pair Dx. Since the front (upper) substrate of the substrate pair Dx at the side close to the light source 66 is heated more intensively, the front substrate expands larger than the rear (lower) substrate close to the stage 100. Because of the presence of the spacer 110, the thermally expanded substrate pair Dx is still kept higher at the center with its height reduced towards the outer circumference.

The adhesive g is set in this state, whereby the substrates Da, Db are bonded.

The substrate pair Dx is cooled when the emission from the light source 66 is stopped upon completion of the photosetting process. The front substrate which had expanded to a greater extent than the rear substrate, shrinks more at this time and tends to warp upward. The substrate pair Dx which is inclined from the center to the outer circumference, i.e., is higher at the center and lower towards the outer circumference when expanded is apt to warp upwards when cooled and shrunken. In consequence, the substrate Dx is brought to a horizontal attitude after the cooling. The spacer 110 enables the warp of the substrate pair Dx to be offset by the slope. That is, the warp deformation of the substrate pair Dx can be cancelled by the inclination formed by the spacer 110 and the stage 100A.

Since the upward warp in the photosetting process is perfectly eliminated or reduced greatly as discussed above, an optical disk D of high flatness can be obtained.

TAPER FACE

Figure 4:
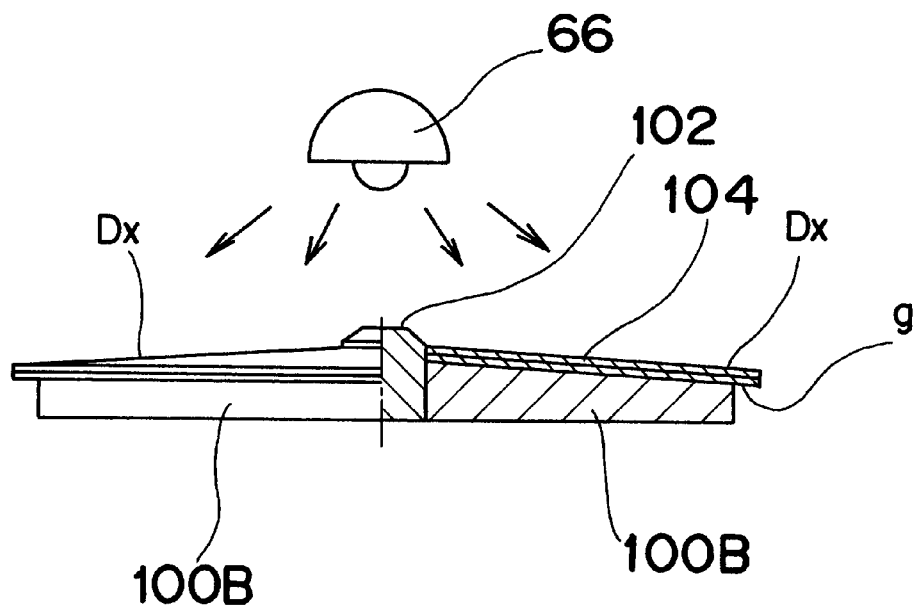
FIG. 4 is a half sectional view of another photosetting process using a stage with a tapered face in a bonding apparatus and method according to a second embodiment of the present invention.

As a second embodiment of the present invention, an upper face 104 of a stage 100B is tapered as shown in FIG. 4.

More specifically, the upper face 104 stands high at a position of the core shaft 102 and gradually uniformly decreases its height towards the outer circumference of the upper face 104, in other words, the upper face 104 is shaped in a flat circular cone.

The photosetting process is carried out in the same manner as described hereinabove.

The substrate pair Dx is deformed through irradiation of light and then turned to a flat circular cone following the tapered face 104 of the stage 100B. When the substrate pair Dx is cooled after the irradiation is completed, the upward warp is offset with the correction deformation by the tapered face 104, so that the obtained substrate pair Dx is in a horizontal state.

HEIGHT VARIABLE SPACER

Figure 5A:
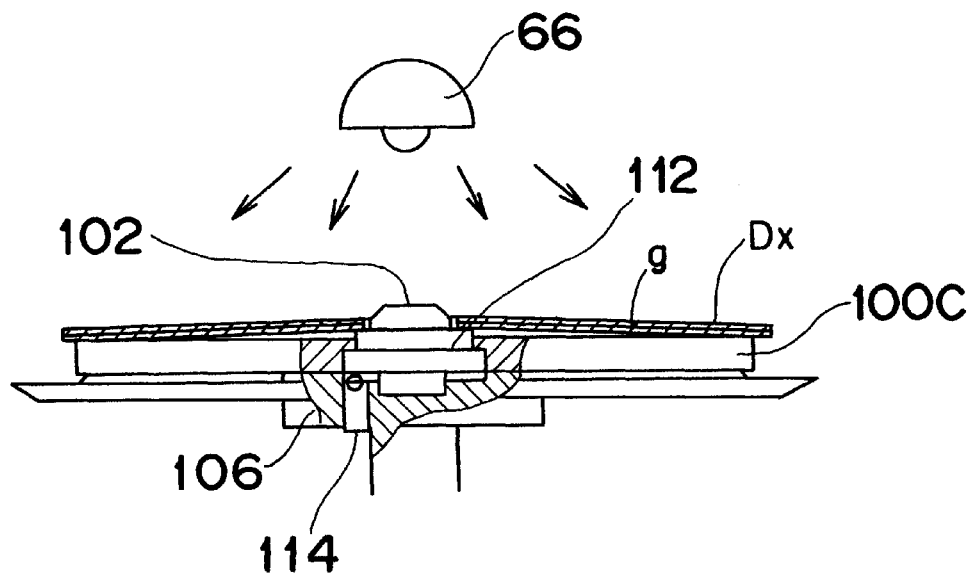
FIG. 5A is a partial sectional view of a still another photosetting process using a height variable spacer in a bonding apparatus and method according to a third embodiment of the present invention.
Figure 5B:
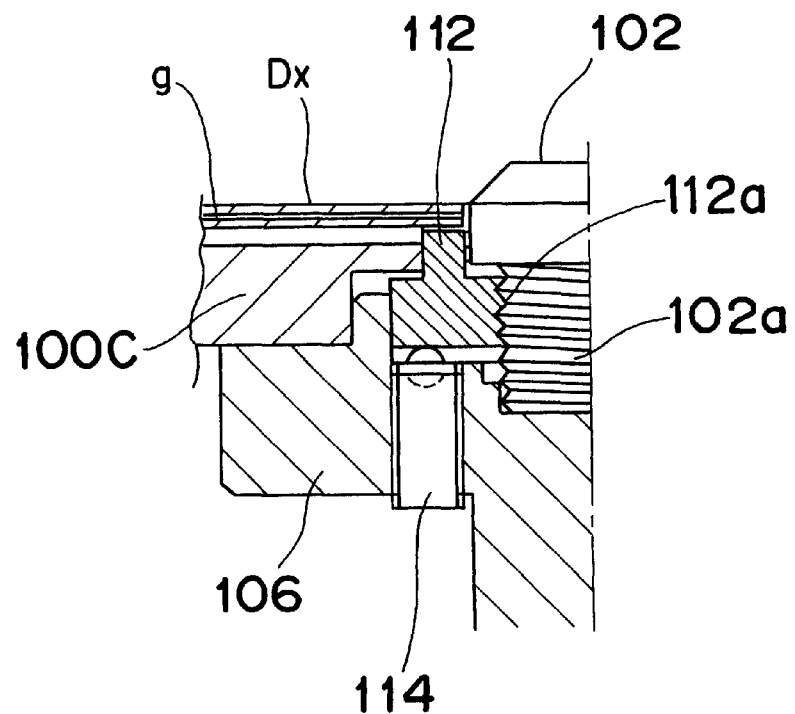
FIG. 5B is a partially enlarged view of FIG. 5A.

As a third embodiment of the present invention, a spacer 112 employed in FIGS. 5A and 5B is a height-variable one.

As illustrated in an enlarged view of FIG. 5B, a male screw 102a is provided in the outer circumference of the core shaft 102 located at the center of the stage 100C. The spacer 112 of a hollow disk is arranged at the outer circumference of the core shaft 102 between the male screw 102a and the stage 100C. The spacer 112 has an upper end projecting from the stage 100C. A female screw 112a formed at an inner circumferential face of the spacer 112 is screwed in the male screw 102a of the core shaft 102. When a position of the spacer 112 screwed to the core shaft 102, that is, a heightwise position of the spacer 112 is changed by turning the spacer 112, a projection length of the spacer 112 from the stage 100C is adjusted.

A supporting body 106 for supporting the stage 100C and the core shaft 102 has a ball plunger 114 contacting a bottom face of the spacer 112. The ball plunger 114 is a mechanism element having a ball at a leading end urged upward by a spring at the back. The ball plunger 114 is contacted the bottom face of the spacer 112 and urged upward, whereby the female screw 112a of the spacer 112 is pressed in touch with the male screw 102a of the core shaft 102 at all times, thereby preventing a shift of the position where the spacer 112 is screwed to the core shaft 102 due to vibrations, shocks, etc. Since the spacer 112 and the ball plunger 114 slide smoothly in rolling contact therebetween when the spacer 112 is turned in order to adjust the screw position, the screw position of the spacer 112 can be adjusted easily.

According to the height variable spacer 112 of the above structure, the projection length from the surface of the stage 100C is adjusted on the basis of an estimated value of the warp of the substrate pair Dx which is obtained beforehand from experiments or data analyses.

The photosetting process afterwards is equally conducted to that in the case using the fixed spacer 110.

In the third embodiment of FIGS. 5A and 5B, the spacer 112 can be adjusted in height properly and easily to conform to operation conditions, and therefore the trouble of preparing many spacers of different thicknesses is eliminated.

TEMPERATURE CONTROL DEVICE

Figure 6A:
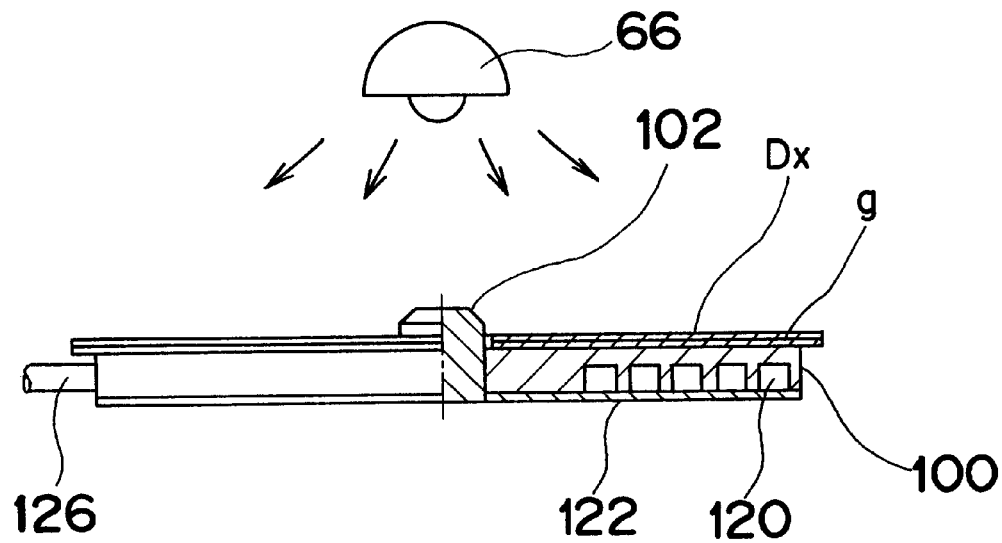
FIG. 6A is a half sectional view of a stage with a temperature control device in a bonding apparatus and method according to a fourth embodiment of the present invention.
Figure 6B:
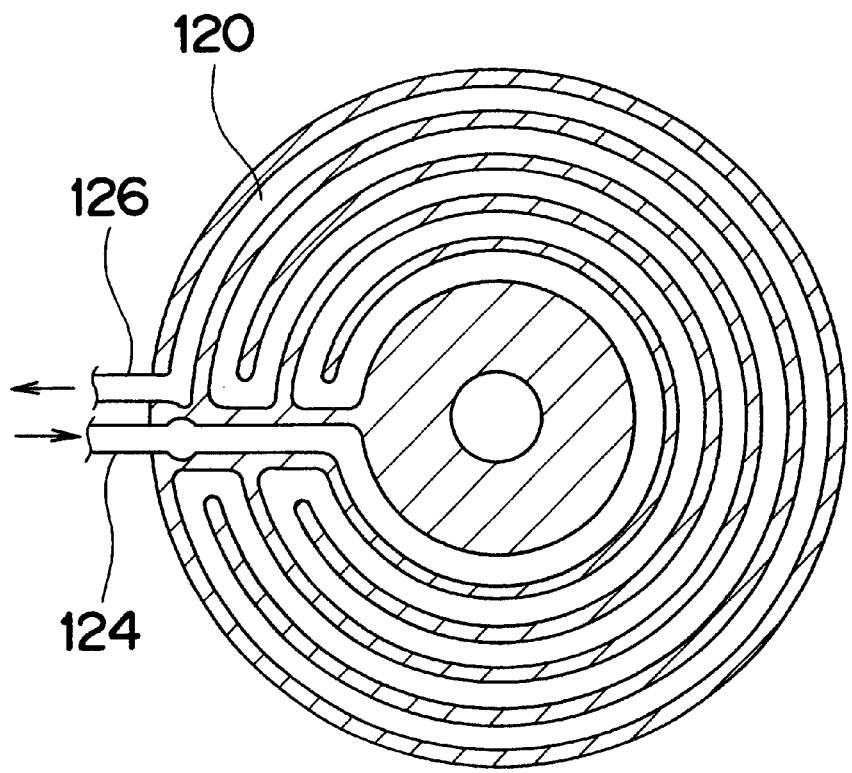
FIG. 6B is a horizontal sectional view of the stage of FIG. 6A.

As a fourth embodiment of the present invention, the stage 100 is provided with a temperature control device of FIGS. 6A and 6B.

As shown in FIG. 6A, the stage 100 has a temperature control medium passage 120 grooved from its rear face, and a back plate 122 for shutting the passage 120 from the rear face.

In FIG. 6B, the temperature control medium passage 120 is connected to a feed piping 124 and a return piping 126 for a temperature control medium at the outer circumference of the flat disk-shaped stage 100. The passage 120 starts from the feed piping 124 towards the center of the stage 100 in a radial direction, runs one round in a circumferential direction in a locus of the letter "C" from the central part of the stage 100, then returns another round in an opposite direction at an outer circumference than the above locus of the letter "C". The passage 120 running in this way is connected to the return piping 126 at the outer circumference of the stage 100.

The temperature control medium such as the air, water, oil, or the like which is regulated in temperature is supplied to the feed piping 124, passing through the passage 120 thereby regulating the entire stage 100 at a constant temperature. The temperature control medium is finally collected from the return piping 126. The feed piping 124 and the return piping 126 are coupled to a temperature control apparatus 330. In the apparatus 330, the temperature control medium collected at the return piping 126 is adjusted again to a predetermined temperature and then fed back to the feed piping 124 to be recycled.

The temperature control device enables heating or cooling to a surface of the rear substrate of the substrate pair Dx closer to the stage 100, and therefore a temperature difference of the surface to a surface of the front substrate heated by the projected light from the light source 66 is adjusted properly.

Moreover, since a temperature of the total surface of the stage 100 is uniform, irregularities in expansion and shrinkage of the substrate pair Dx in the plane direction are reduced, local swell or warp in the plane direction is prevented, and eventually the whole substrate pair Dx is improved in its degree of flatness.

Even if temperature of the stage 100 or temperature in the surrounding environment of the stage 100 is changed with time by heat generated inside the bonding apparatus after the bonding apparatus starts operating, the surface of the stage 100 or the surface of the substrate pair Dx can be maintained under a proper temperature condition by the above temperature control device. Accordingly, a variation in amount of the deformation for every optical disk is eliminated, thus realizing optical disks of stable quality.

A non-contact type temperature sensor 301 that can detect the temperature of the surface of the stage 100 or the substrate pair Dx may be installed above the stage 100 or at a passage where the stages 100 are moved. A feed temperature or feed amount of the temperature control medium can be controlled on the basis of temperature information detected by the sensor 301.

TEMPORARY SETTING AND COMPLETE SETTING

The photosetting process is specifically described hereinbelow. The photosetting process is executed in a plurality of divided stages, namely, temporary setting and complete setting, with the use of the stages 100 having the spacers 110 shown in FIG. 3.

The substrate pair Dx for a DVD is subjected to a photosetting process. Doughnut-shaped circular plates of different thicknesses and outer diameters of 20–30 mm are used as the spacer 110. The stage 100 has an outer diameter of 115 mm. The light source 66 is an ultraviolet projection lamp. A shutter part for controlling a projection timing of light is arranged between the light source 66 and the substrate pair Dx. Then, the substrate pairs Dx are continuously supplied and bonded.

TEMPORARY SETTING PROCESS:

The light source 66 is set at 30% (220 mW/cm$^2$) of power. An irradiation time is set to be 0.3 sec by controlling the shutter part.

COMPLETE SETTING PROCESS:

The light source 66 is set at 65% (1050 mW/cm$^2$) of power and the irradiation time is set to be 1.2 sec.

Figure 7A:
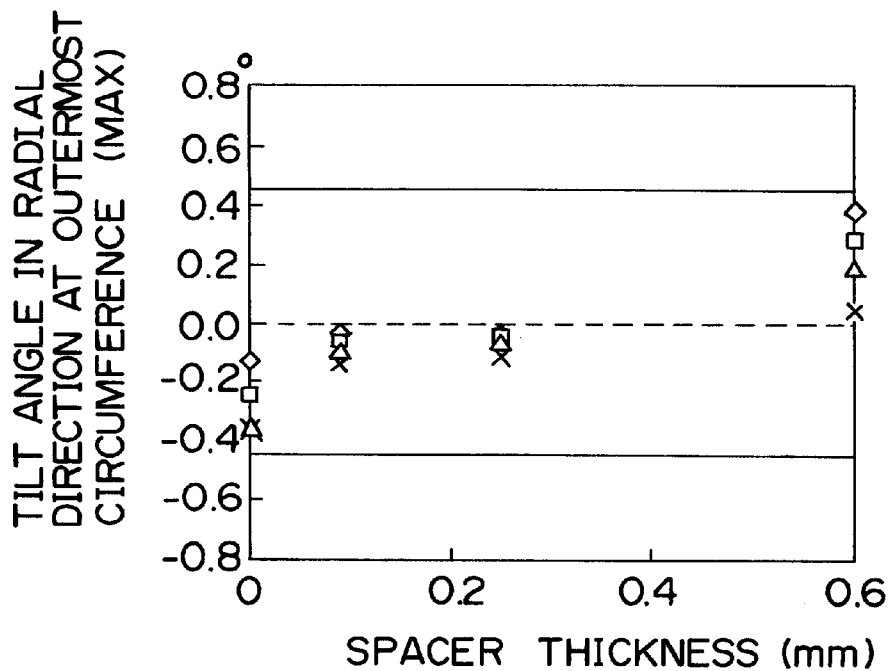
FIGS. 7A and 7B are graphs of measurement results of a deformation amount of an optical disk.
Figure 7B:
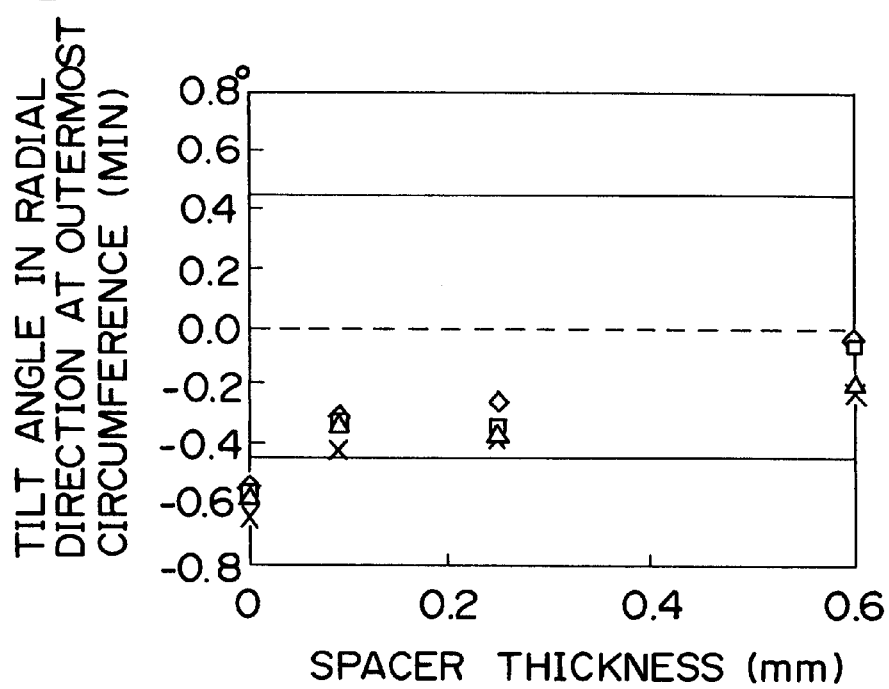

The amount of the warp of the optical disk bonded in the photosetting process in two steps is evaluated. Specifically, an angle of the warp in the radial direction at a position of the outermost circumference of the disk to a position of the innermost circumference of the disk is measured as a tilt angle, and a maximum value (MAX) and a minimum value (MIN) of the tilt angles measured in the circumferential direction of the optical disk are obtained. FIGS. 7A and 7B are graphs showing results of the measurements obtained with various thicknesses of the spacer 110.

The graphs of FIGS. 7A and 7B indicate that it possible to keep the warp amount of the optical disk within a fixed ranged if the thickness of the spacer 110 is set properly. The warp deformation is minimized when the spacer has the thickness of approximately 0.25 mm in FIGS. 7A and 7B.

A tolerance of the tilt angle is ±0.8° in general DVDs, and the tolerance at the production time of the disks is set to be approximately ±0.5°. Even when the spacer 110 has 0 mm thickness, that is, even when no spacer 110 is used, the tolerance may be nearly satisfied by a simple combination of the temporary setting and complete setting. However, the additional use of the spacer 110 of a suitable thickness can achieve higher flatness of the optical disk.

Figure 8:
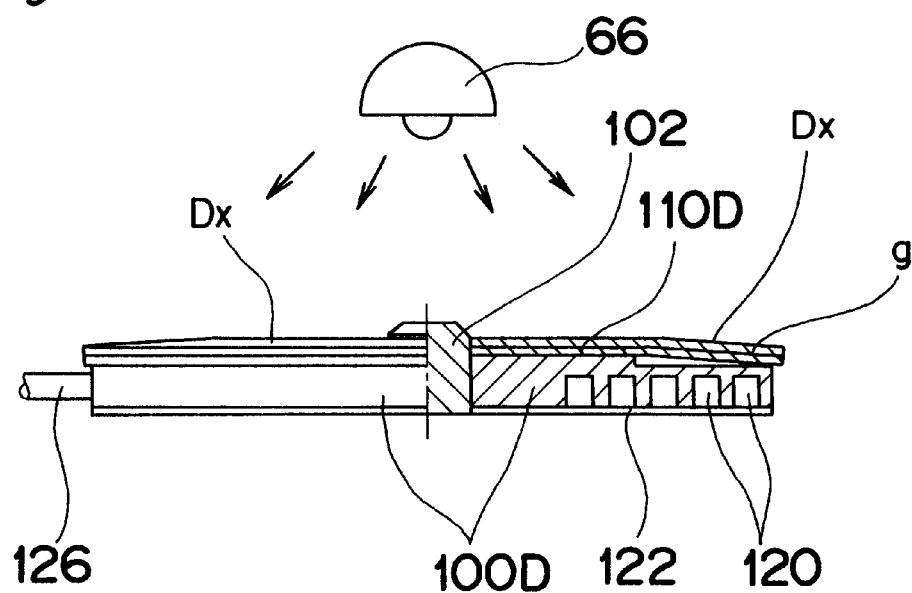
FIG. 8 is a half sectional view of a photosetting process using a stage in a bonding apparatus and method according to a fifth embodiment of the present invention

FIG. 8 is a half sectional view of a photosetting process using a stage in a bonding apparatus and method according to a fifth embodiment of the present invention. The fifth embodiment is constituted by combining the first embodiment and the fourth. embodiment. That is, as shown in FIG. 8, a spacer 110D is fixedly and integrally set at a flat surface of a stage 100D. That is, the spacer 110D is a doughnut-shaped circular plate portion mechanically processed around the center shaft 102 at the center of the stage 100D. As examples, there may be prepared the stages 100D having the spacers 110D of diameters of 60 mm, 70 mm, 80 mm, 90 mm etc. A suitable one of the spacers 110D is selected from the spacers 110D in correspondence with the dimension of the warp deformation of the substrate pair Dx. The stage 100D has the temperature control medium passage 120 grooved from its rear face and flowing the temperature control medium such as the air, and the back plate 122 for shutting the passage 120 from the rear face. The temperature control medium passage 120 may have the same shape of FIG. 6B.

Figure 9:
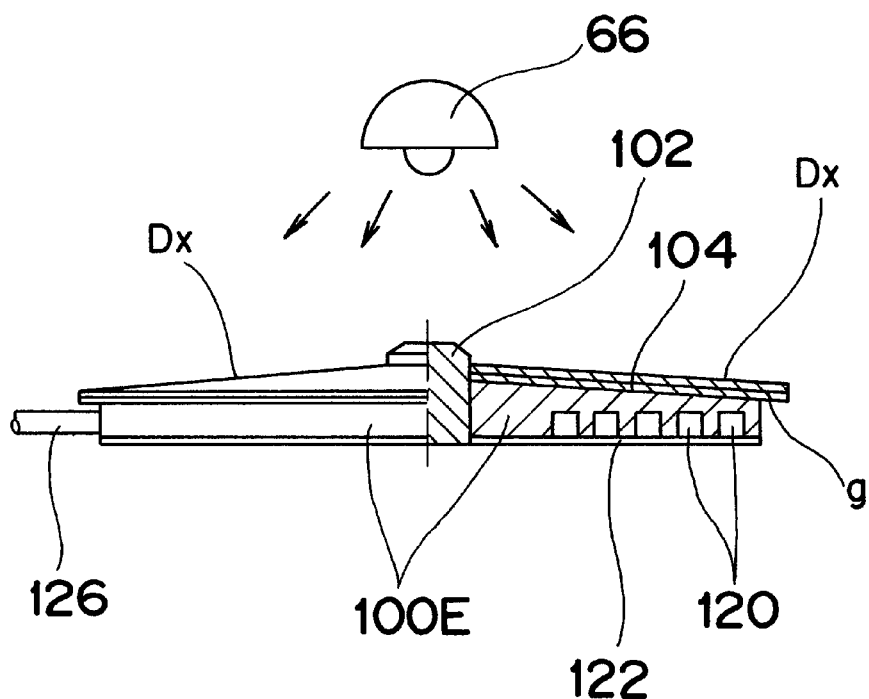
FIG. 9 is a half sectional view of a photosetting process using a stage in a bonding apparatus and method according to a sixth embodiment of the present invention

FIG. 9 is a half sectional view of a photosetting process using a stage in a bonding apparatus and method according to a sixth embodiment of the present invention. The sixth embodiment is constituted by combining the second embodiment and the fourth embodiment. That is, as shown in FIG. 9, an upper face 104 of a stage 100E is tapered. More specifically, the upper face 104 stands high at a position of the core shaft 102 and gradually uniformly decreases its height towards the outer circumference of the upper face 104, in other words, the upper face 104 is shaped in a flat circular cone. As one example, a height of the upper face 104 of the stage 100E is set in a range of 22 mm–120 mm in diameter and a tilt angle θ of 0.1–0.34 degrees which means an angle of the warp in the radial direction at a position of the outermost circumference of the upper face 104 to a position of the innermost circumference of the upper face 104 when each of the substrates has a diameter of 120 mm. The stage 100E has the temperature control medium passage 120 grooved from its rear face and flowing the temperature control medium such as the air, and the back plate 122 for shutting the passage 120 from the rear face. The temperature control medium passage 120 may have the same shape of FIG. 6B. As examples, there may be prepared the spacers 100E have heights H of 0.1 mm, 0.15 mm, 0.2 mm, 0.25 mm, 0.3 mm, 0.35 mm etc., that is, tilt angles θ obtained by substituting the heights H of 0.1 mm, 0.15 mm, 0.2 mm, 0.25 mm, 0.3 mm, 0.35 mm into an equation: θ=tan$^{-1}$(H/60 mm). A suitable one of the spacers 100E is selected from the spacers 100E in correspondence with the inclination of the warp deformation of the substrate pair Dx.

The selection of the spacers 100A, 100B, 100D, and 100E is carried out as follows. For easy understanding, the selection of the spacers 100D and 100E of FIGS. 8 and 9 are exemplified. The selection of the spacers 100A and 100B is almost the same as that of the spacers 100D and 100E.

First, a plurality of optical disks, as samples, are manufactured by the bonding apparatus and the tilt angles of the disks D are measured by the inspection part 70. Then, the maximum data and the minimum data are extracted from the measured results to make a graph showing relation between the tilt angle and the distance in radial direction of the disk. Instead of the samples, the actually manufactured optical disks may be inspected and measured to obtain the above data.

Figure 10:
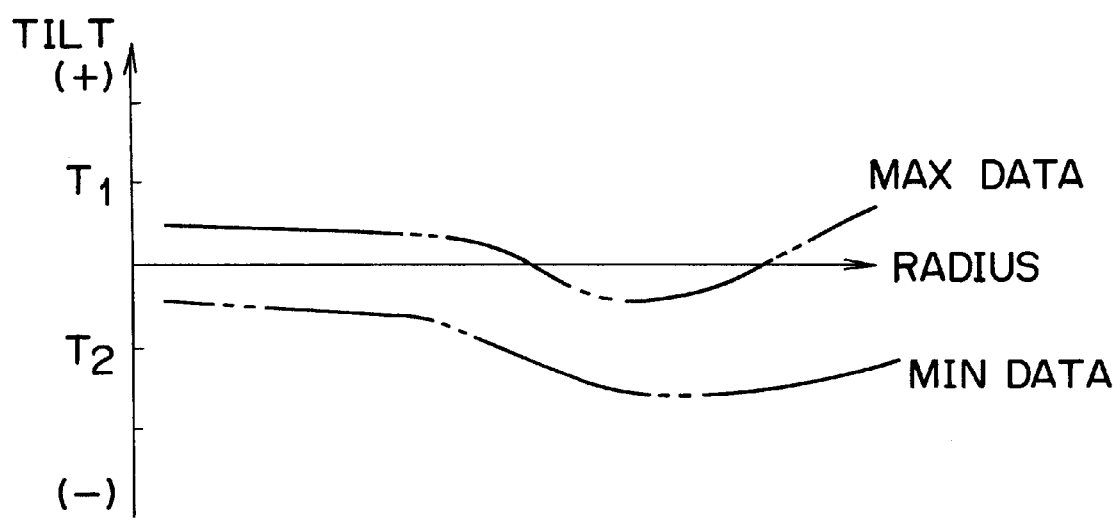
FIG. 10 is a graph showing one example of a relation between a tilt angle and a distance in radial direction.
Figure 12:
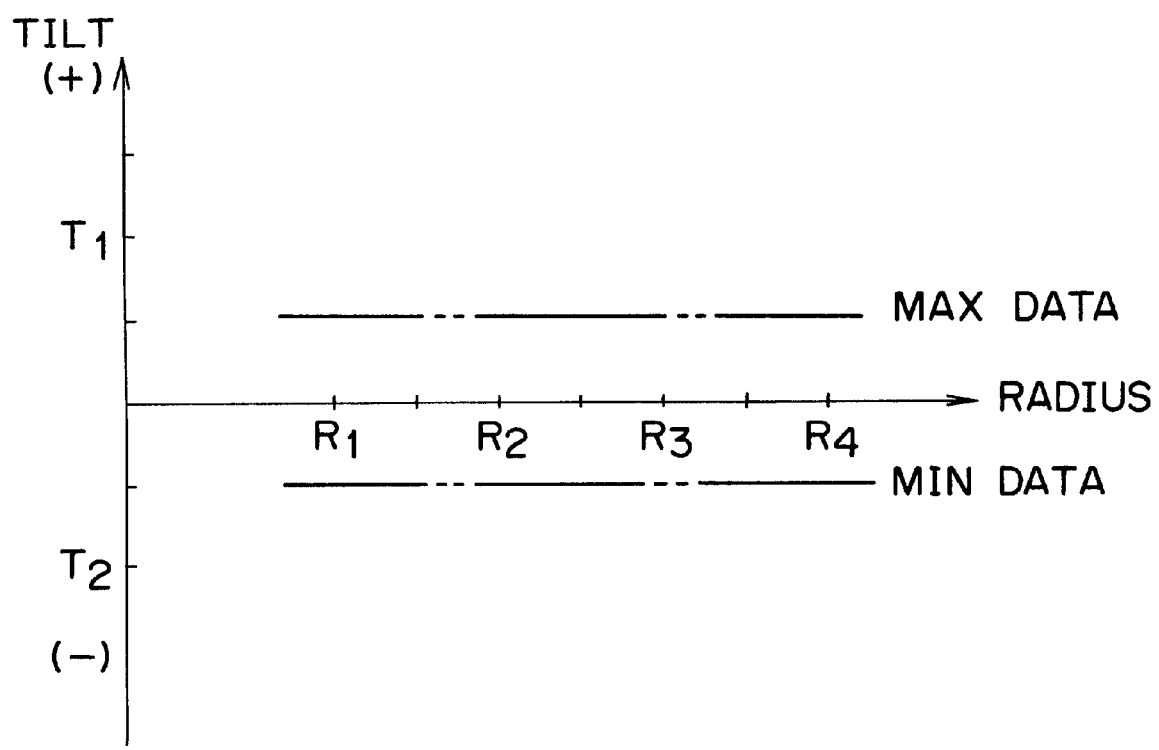
FIG. 12 is a graph showing a regulated relation between a tilt angle and a distance in radial direction.

When the found graph is the graph of FIG. 10, it is found that there is a recess at a position in the radial direction of the disk. In such a case, the spacer 100A or 100D of FIG. 3 or FIG. 8 is used. When a plurality of spaces 100A or 100D having different diameters are prepared, one of the spaces 100A or 100D is preferably selected depending on the position of the recess, so as to make lines of the maximum data and the minimum data parallel to the abscissa axis as shown in FIG. 12.

Figure 11:
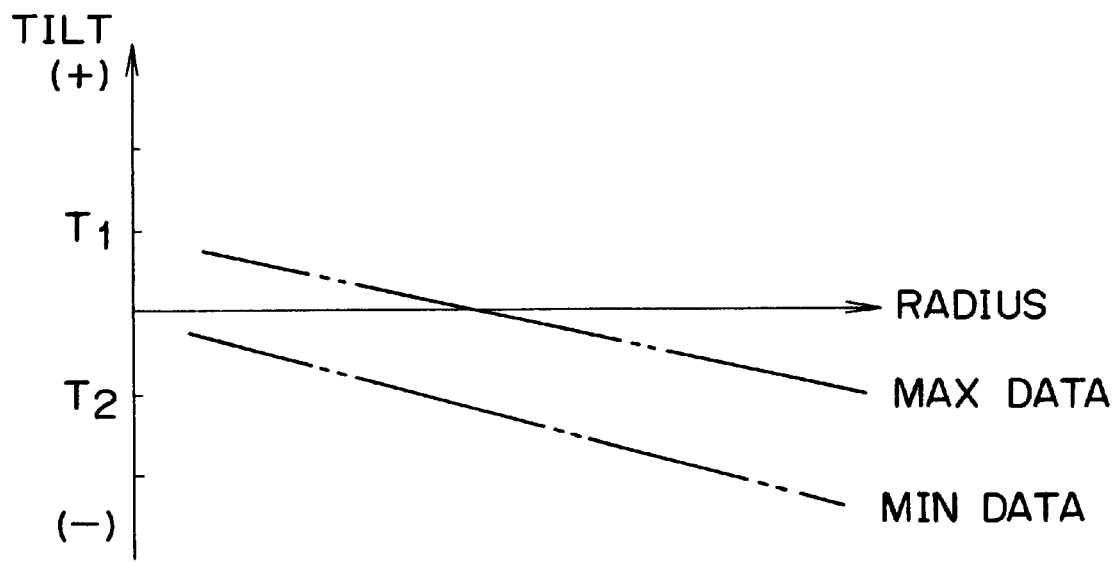
FIG. 11 is a graph showing another example of a relation between a tilt angle and a distance in radial direction.

When the found graph is the graph of FIG. 11, it is found that there is a slope in the radial direction of the disk. In such a case, the spacer 100B or 100E of FIG. 4 or FIG. 9 is used. When a plurality of spaces 100B or 100E having different inclinations are prepared, one of the spaces 100B or 100E is preferably selected depending on the inclination of the slope, so as to make lines of the maximum data and the minimum data parallel to the abscissa axis as shown in FIG. 12.

When the spacer 100D or 100E is selected, the temperature of the spacer 100D or 100E is adjusted. That is, a distance between the zero point of the graph of FIG. 10 or FIG. 11 in the ordinate axis of the tilt angle and a position where the center line of the found graph crosses the ordinate axis is calculated. Based on the found distance and the temperature of the spacer detected by the temperature sensor 301, the temperature of the air as one example of the temperature control medium for flowing in and cooling or heating the spacer 100D or 100E is controlled so as to reduce the distance between the zero point and the position as shown in FIG. 12. In most cases, since the spacer is heated by the ultraviolet irradiation part 62, the spacer is cooled with the air. In general, when the temperature of the spacer is increased, the found graph is relatively moved downward, i.e. in the minus direction. When the temperature of the spacer is decreased, the found graph is relatively moved upward, i.e. in the plus direction. As a result, the optimum selection and the temperature adjustment of the spacer allows optical disks D with a higher degree of flatness to be surely obtained.

In one example, two or three stages 100D of FIG. 8 and one stage 100E of FIG. 9 are prepared, and when it is difficult to use the stages 100D, the stage 100E is used.

The material of the stage preferably has good thermal conductivity so as to make it easy to control the temperature of the stage.

Figure 13:
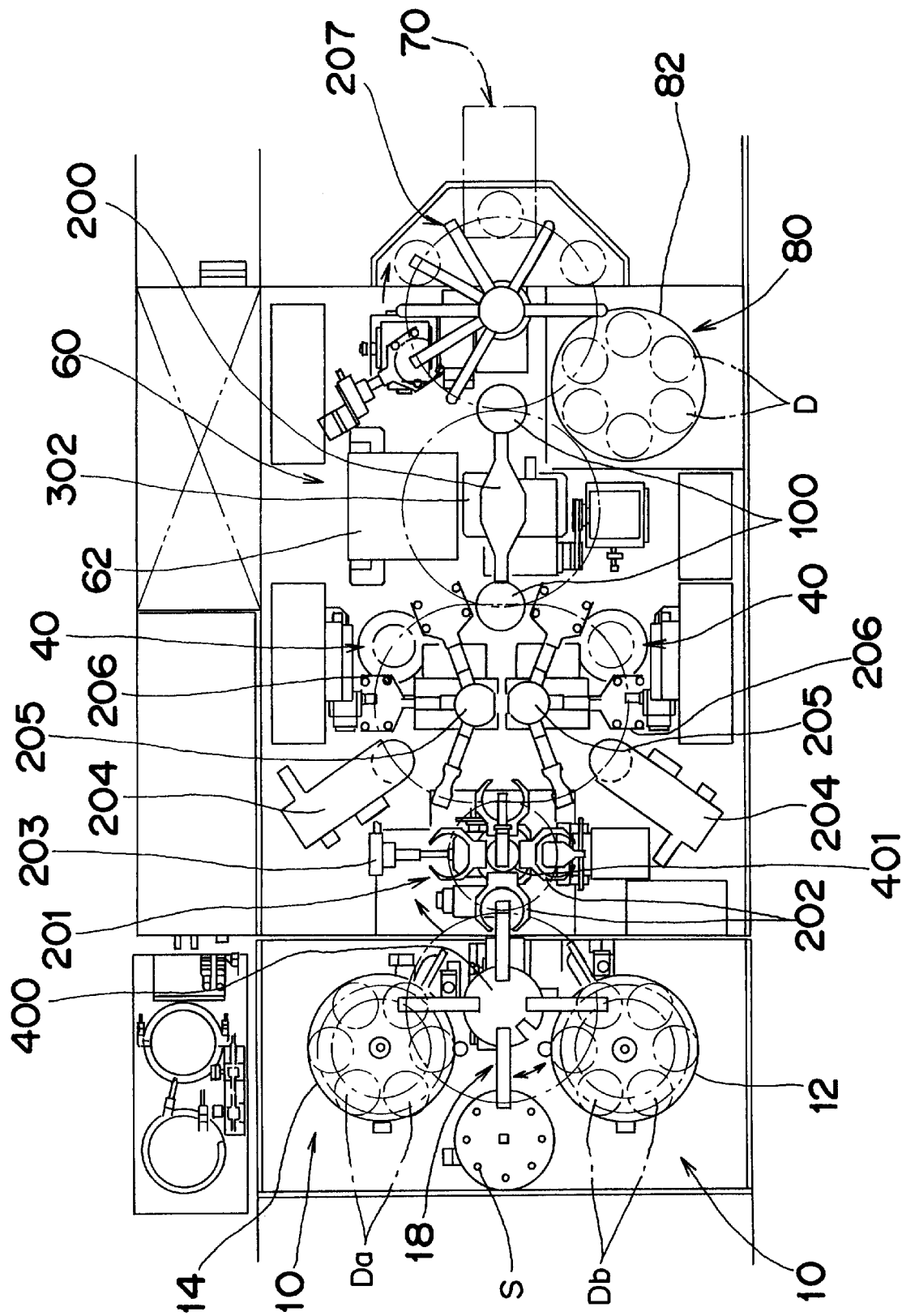
FIG. 13 is a schematic plan view of showing a total structure of a bonding apparatus a bonding apparatus and method according to a seventh embodiment of the present invention.

FIG. 13 is a schematic plan view showing a total structure of a bonding apparatus and method according to a seventh embodiment of the present invention.

The bonding apparatus is different from the bonding apparatus in FIG. 1 in structure. The bonding apparatus has two substrate pile parts 10 where the substrates Da, Db are piled on turntables 14, 12 at the substrate pile parts 10. A crossed turning arm 18 reciprocally and intermittently rotates by 90 degrees by an arm driving device 400. As a result, the substrates Da, Db are alternatively transferred from the substrate pile parts 10 to a second turning arm 201 so as to supply the substrates in order of Da, Db, Da, Db. The second turning arm 201 has four chucks 202 for holding the substrates and is clockwisely and intermittently rotated by a first transfer device 401. The second turning arm 201 is reciprocally moved within a specified range by a second transfer device 205 and transfers the substrates Da, Db received from the crossed turning arm 18 to one of third transfer arms while the two substrates are held by a chuck 206 of the third transfer arm. A substrate inversion device 203 inverts one of the substrates Da or Db so that the recording layers of the substrates Da and Db are faced to each other.

Each of the third transfer arms receives the substrates Da and Db with the recording layers of the substrates Da and Db faced to each other, and transfers the faced substrates Da and Db to an adhesive application device 204 to inject the adhesive into the gap g between the faced substrates Da and Db. And then each of the third transfer arms transfers the substrates Da and Db with the adhesive injected into the gap g to the bond part 40. At the bond part 40, the gap g is narrowed by moving one of the substrates Da, Db against the other of the substrates. Then, each of the third transfer arms transfers the substrates Da and Db to a stage movement arm 200, and then, the substrates Da and Db, i.e. substrate pair Dx is placed on one of the stages 100 spaced 180 degrees.

The stage movement arm 200 has the two stages 100 and is rotated by 180 degrees by a stage driving device 302 while each of the stages 100 passes through a ultraviolet irradiation part 62 in a photosetting part 60. The photosetting part 60 sets the adhesive with ultraviolet rays.

After the substrate pair Dx passes through the ultraviolet irradiation part 62 and the adhesive in the gap g between the substrates is photoset to obtain a optical disk D as a product, the substrate pair Dx is transferred from the stage movement arm 200 to a product transfer arm 207. The product transfer arm 207 has a plurality of arm elements for holding the optical disks D to sequentially transfer them and pile them on a turntable 82 of an optical disk collection part 80. An inspection part 70 is located in a way from the stage movement arm 200 to the turntable 82 of the optical disk collection part 80. The inspection part 70 inspects manufactured optical disks D. If an unfavorable product is found by the inspection part 70, the unfavorable product is removed so as not to pile it on the turntable 82.

Figure 20:
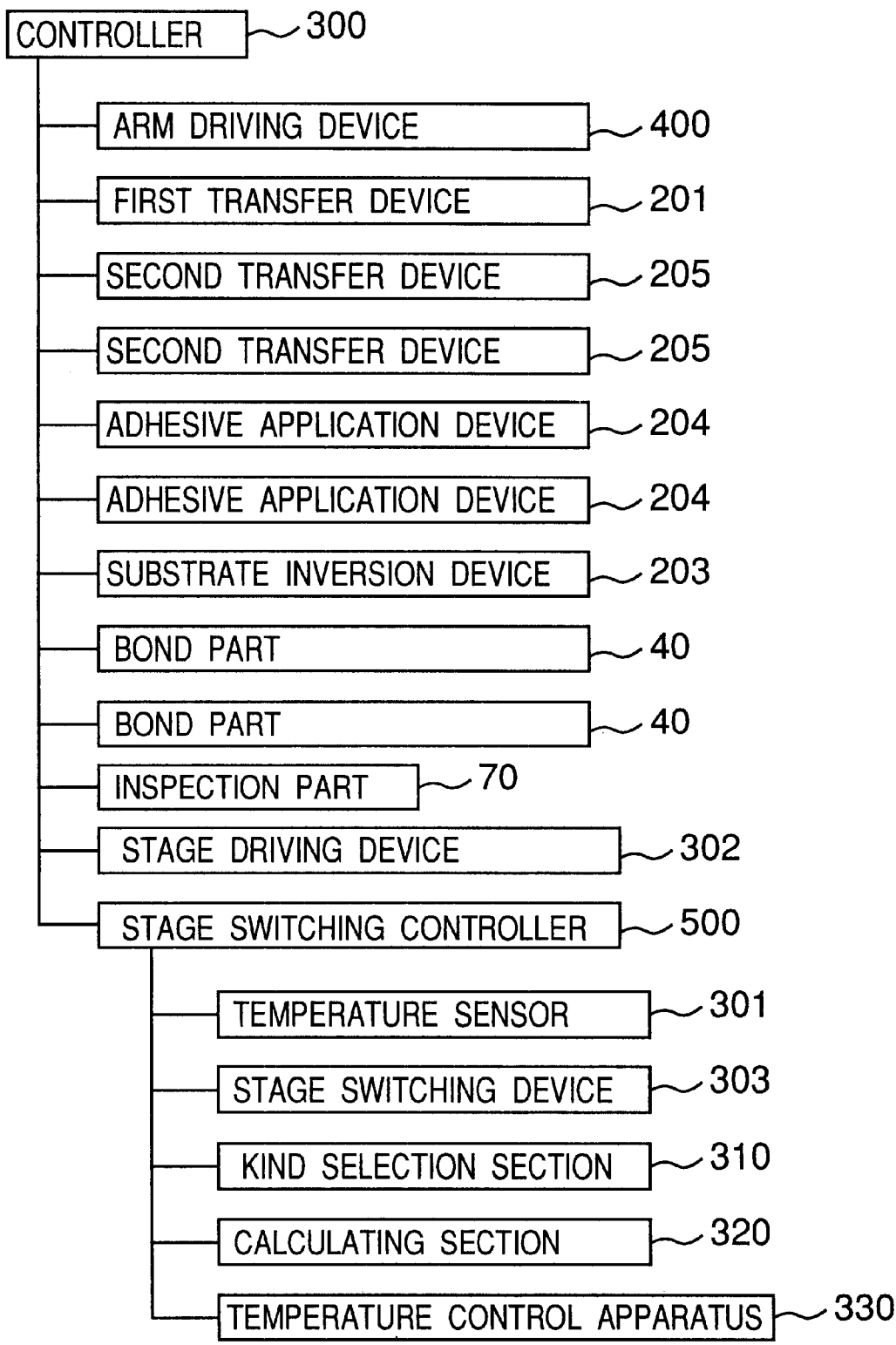
FIG. 20 is a block diagram of a control unit of the bonding apparatus of the seventh embodiment.

FIG. 20 is a block diagram of control unit of the bonding apparatus of the seventh embodiment. A controller 300 is connected to the arm driving device 400, the first transfer device 401, the second transfer devices 205, the adhesive application devices 204, the substrate inversion device 203, the bond parts 40, the stage driving device 302, and a stage switching controller 500 so as to control the operations of the above devices or members. The stage switching controller 500 for controlling stage switching operation is connected to the temperature sensor 301, a stage switching device 303, a kind selection section 310, a calculating section 320, and the temperature control apparatus 330 so as to control the operations of the above devices or sections.

Figure 21:
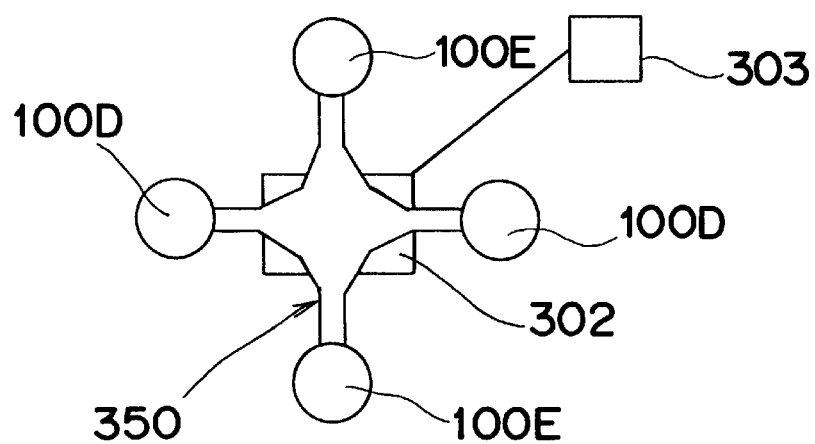
FIG. 21 is a plan view of a stage switching arm of a modification of the seventh embodiment.

FIG. 21 is a plan view of a stage switching arm of a modification of the seventh embodiment. That is, instead of the stage movement arm 200, a stage switching arm 350 is provided. The stage switching arm 350 has two kinds of spacers 100D, 100E with the same kind of spacers spaced 180 degrees. The stage switching arm 350 is normally rotated by 180 degrees by a stage driving device 302. When the kind of spacer is changed, the stage switching device 303 controls the stage driving device 302 so as to rotate the stage switching arm 350 by 90 degrees to switch the spacers 100D with the another kind of spacer 100E or vice versa.

In this modification, the switching of the kinds of the stages can be automatically carried out by using the inspection part 70, the temperature sensor 301, the stage switching device 303, the kind selection section 310, the calculating section 320, and the temperature control apparatus 330 under control operation of the stage switching controller 500. That is, the tilt angles of the optical disks D are detected by the inspection part 70. The kind selection section 310 selects the suitable kind of spacer based on the detected results. Then, it is decided whether or not the selected kind of stage is used, if yes, the stage switching operation is unnecessary. If no, the stage switching operation is carried out. That is, based on the selection of the kind selection section 310, the stage switching device 303 is driven to drive the stage driving device 302 so as to rotate the stage switching arm 350 by 90 degrees. Thus, the kind of spacer is switched with another kind of spacer. Then, the calculating section 320 calculates the distance between the zero point of the graph of FIG. 10 or FIG. 11 in the ordinate axis of the tilt angle and a position where the center line of the found graph crosses the ordinate axis. Based on the calculated results and the temperature of the selected spacer detected by the temperature sensor 301, the temperature of the air as one example of the temperature control medium for flowing in and cooling or heating the spacer 100D or 100E is controlled by the temperature control apparatus 330 so as to reduce the distance between the zero point and the position as shown in FIG. 12. As a result, the optimum selection and the temperature adjustment of the spacer allows the optical disks D with a higher degree of flatness to be surely obtained.

SHUTTER PART

Figure 14A:
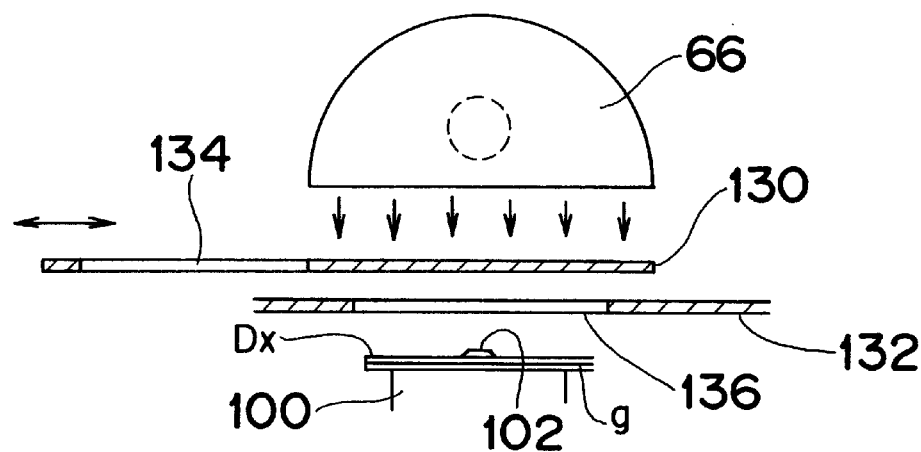
FIGS. 14A and 14B are step-by-step schematic diagrams of the photosetting process using a shutter part in a bonding apparatus and method according to an eighth embodiment of the present invention.
Figure 14B:
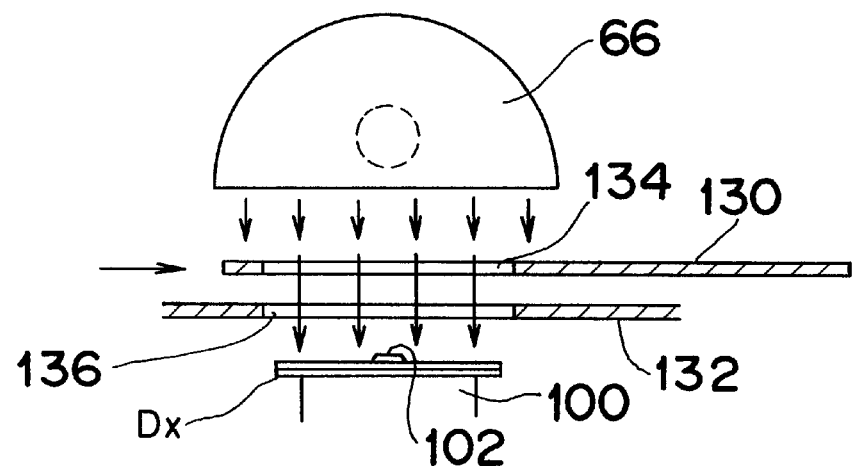
Figure 15:
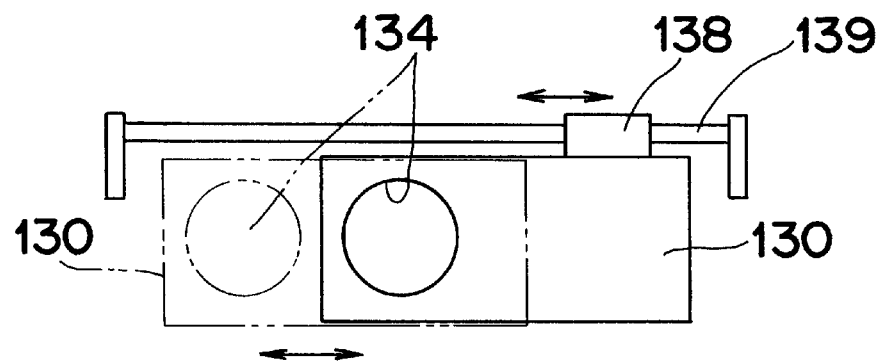
FIG. 15 is a plan view of the shutter part of FIG. 14.

In an eighth embodiment of the present invention, as shown in FIGS. 14A, 14B, and 15, both the temporary setting and the complete setting are carried out, the shutter part is constructed to precisely control the irradiation time of the setting light.

A rectangular plate-shaped shielding member 130 movable in a horizontal direction is arranged between the light source 66 and the substrate pair Dx. As is clear from FIG. 15, a circular light-passing space 134 penetrates one side of the shielding member 130. The shielding member 130 supported by a rodless cylinder 138 slidable along a guide rod 139 reciprocates linearly.

As shown in FIG. 14A, a fixed shielding plate 132 is set between the shielding member 130 and the stage 100. A circular through hole 136 of almost the same size as the outer diameter of the substrate pair Dx is formed at a position of the fixed shielding plate 132 corresponding to the stage 100. The shutter part operates as follows.

Referring to FIG. 14A, when the light-passing space 134 of the shielding member 130 is present at a position shifted from the through hole 136 of the fixed shielding plate 132, the light from the light source 66 is blocked by the shielding member 130 and does not reach the substrate pair Dx.

On the other hand, in FIG. 14B, when the shielding member 130 moves horizontally to bring the light-passing space 134 to a position where the light-passing space 134 aligns with the through hole 136 of the fixed shielding plate 132, the light from the light source 66 reaches the substrate pair Dx through the light-passing space 134 and the through hole 136.

A necessary quantity of light is fed to the substrate pair Dx in the above state of FIG. 14B for a fixed time, and then the shielding member 130 is moved horizontally to an original position, namely, in a state of FIG. 14A, whereby the light is not shed onto the substrate pair Dx.

A time for the light to be shed onto the substrate pair Dx is correctly controlled when the action of the shielding member 130 is controlled. The shielding member 130 is relatively simple in structure and operation and therefore, can operate correctly and stably.

In the above eighth embodiment, the light-passing space 134 of the shielding member 130 can be constituted of many slits in a row. The light-passing space 134 constituted of the slits is effective to control the quantity of light projected to the substrate pair Dx, or ease a difference in intensity of light between the center and the periphery of the light source 66, etc. The slits are also replaceable with many fine openings.

SHUTTER PART IN DIFFERENT EMBODIMENT

Figure 16A:
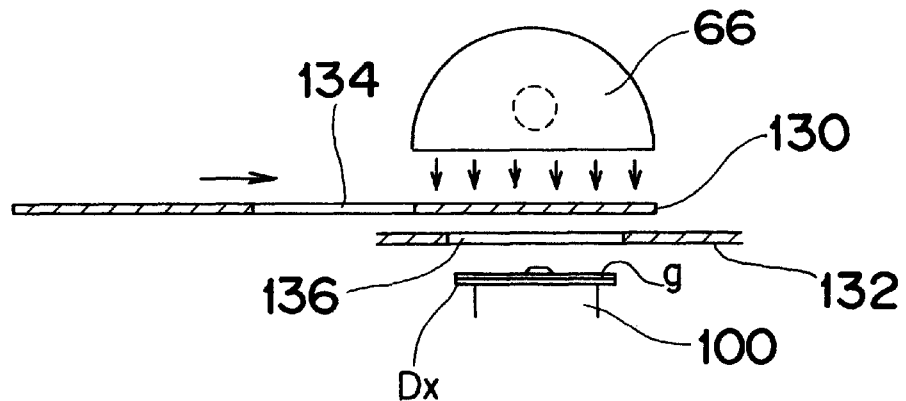
FIGS. 16A, 16B, and 16C are step-by-step schematic diagrams of a photosetting process in a bonding apparatus and method according to a ninth embodiment of the present invention.
Figure 16B:
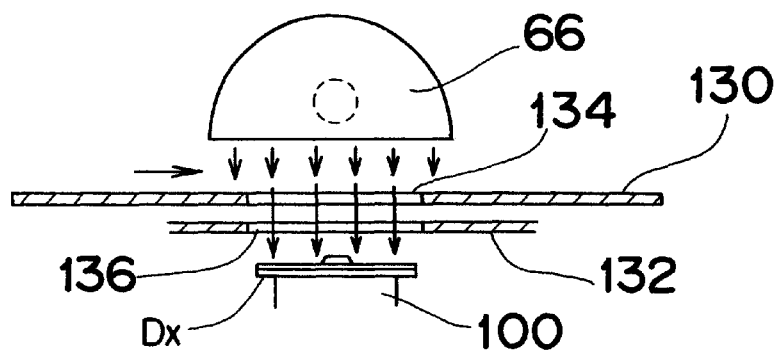
Figure 16C:
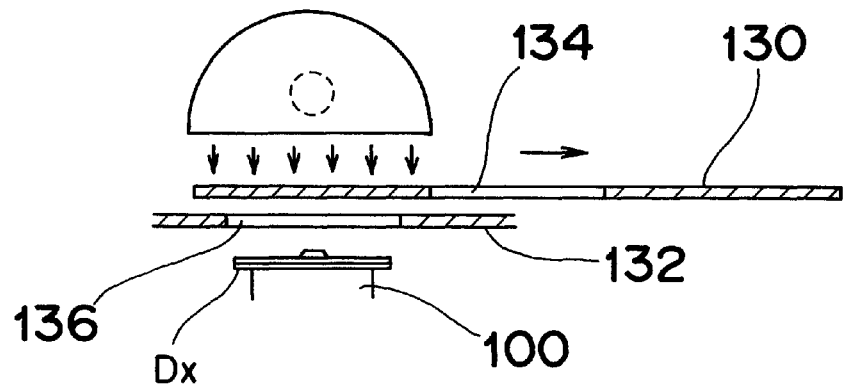

As a ninth embodiment of the present invention, a shielding member 130 of a shutter part in FIGS. 16A–16C operates in a different manner from the eighth embodiment.

A light-passing space 134 is formed in the vicinity of the center of the shielding member 130 in a longitudinal direction thereof, as shown in FIG. 16A. A fixed shielding plate 132 and a through hole 136 are in the same constitution as in the eighth embodiment.

When the shielding member 130 moves rightward from a position of FIG. 16A to a position of FIG. 16B, the light-passing space 134 aligns with the through hole 136, so that the light of the light source 66 is projected to the substrate pair Dx.

In FIG. 16C, the shielding member 130 moves horizontally rightward from the state of FIG. 16B and the light-passing space 134 is displaced from the position corresponding to the through hole 136, whereby the light of the light source 66 is shut by the shielding member 130.

According to the ninth embodiment, one irradiation of light to the substrate pair Dx is completed while the shielding member 130 moves once from left to right. In comparing the ninth embodiment with the eighth embodiment of FIGS. 14A, 14B, and 15 wherein the shielding member 130 reciprocates to return to the original position, the irradiation time is shortened and can be controlled precisely.

The irradiation of light for the next time is accomplished while the shielding member 30 moves from right to left once.

SHUTTER PART IN A FURTHER DIFFERENT EMBODIMENT

As a tenth embodiment of the present invention, a pair of shielding members are employed as shown in FIGS. 17A, 17B, 18, and 19.

Figure 17A:
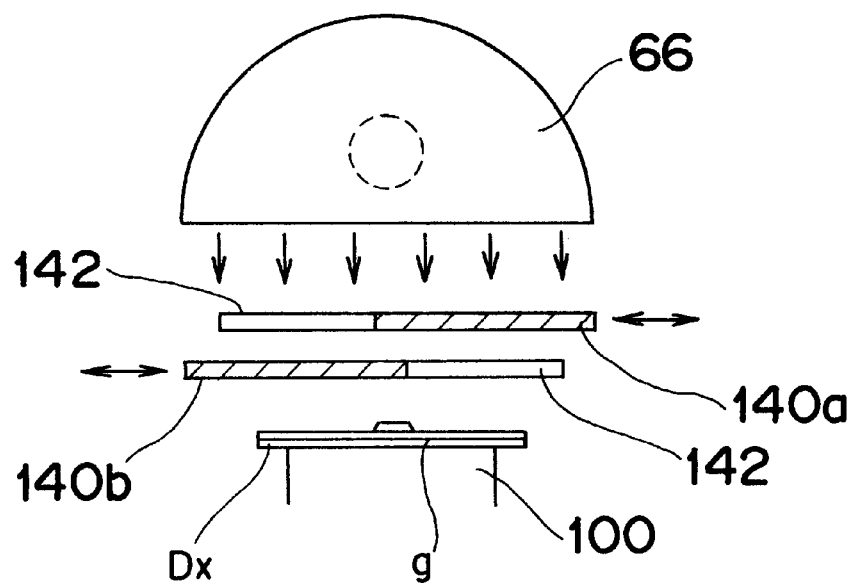
FIGS. 17A and 17B are step-by-step schematic diagrams of a photosetting process in a bonding apparatus and method according to a tenth embodiment of the present invention.
Figure 18:
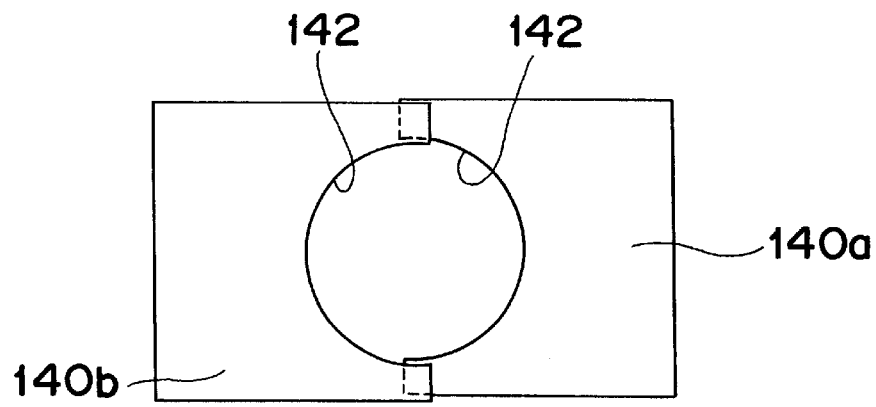
FIG. 18 is a plan view of the shutter part of FIGS. 17A and 17B.

As shown in FIG. 18, the pair of shielding members 140a, 140b are rectangular plate-shaped ones. A light-passing space 142 of a semicircle is formed at one side (left side of FIG. 17A) of the shielding member 140a, and a light-passing space 142 of the same shape is formed at one side (right side of FIG. 17A) of the shielding member 140b opposite to the above light-passing space 142 of the shielding member 140a. The light-passing spaces 142, 142 of the shielding members 140a, 140b when arranged side by side produce a circular light-passing space.

In FIG. 17A, the pair of shielding members 104a, 140b are arranged to nearly overlap in an up-down direction between the light source 66 and the stage 100.

Since each light-passing space 142 is shut by the counterpart shielding member 140a, 140b, the light from the light source 66 does not reach the substrate pair Dx.

Figure 17B:
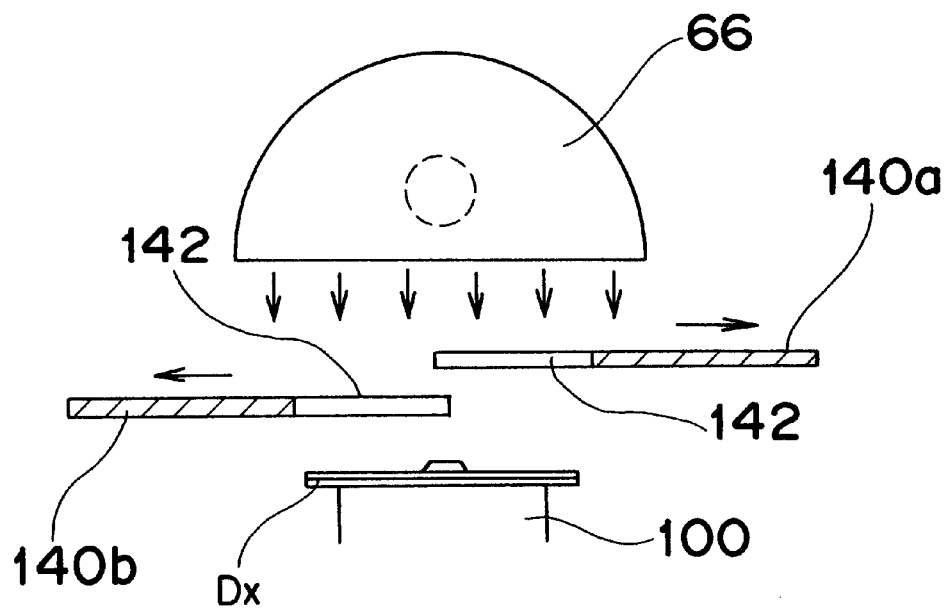

In FIG. 17B, the shielding members 140a, 140b move in opposite directions horizontally. As a result, as is indicated in FIG. 18 alike, the light-passing spaces 142, 142 of the shielding members 140a, 140b are aligned side by side, enabling the light of the light source 66 to pass therethrough to reach the substrate pair Dx.

After the irradiation of light to the substrate pair Dx is finished, the shielding members 140a, 140b move and return to the state of FIG. 17A, shutting the light from the light source 66.

Figure 19:
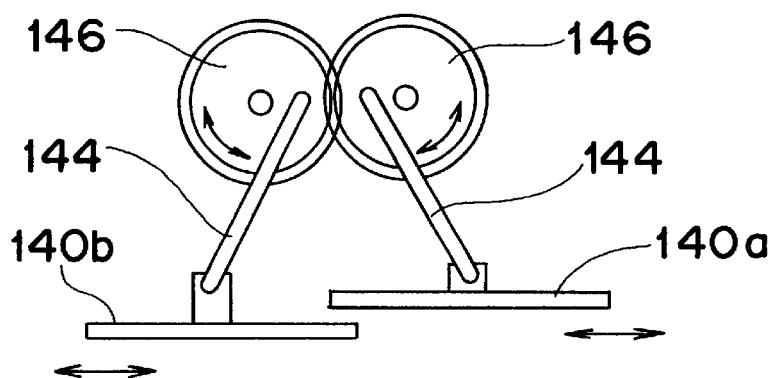
FIG. 19 is a diagram of a driving mechanism for the shutter part of FIGS. 17A and 17B.

FIG. 19 shows a mechanism for reciprocating the shielding members 140a, 140b in opposite directions interlockingly.

Gears 146, 146 in pairs are meshed with each other. When one gear 146 is rotated by a motor or the like, the meshed gears 146, 146 rotate in opposite directions.

The pair of shielding members 140a, 140b are coupled to the gears 146, 146 via respective links 144, 144. Coupling points at both ends of each link 144 are rendered rotatable. The shielding members 140a, 140b are supported by a guide structure such as a guide rail or the like (not shown) to be movable horizontally.

When the pair of gears 146, 146 are rotated in opposite directions, the shielding members 140a, 140b coupled via the links 144, 144 move horizontally in opposite directions by a fixed distance and then return horizontally to the original positions. The rotation of the gears 146, 146 thus makes the shielding members 140a, 140b reciprocate in opposite directions. When a rotational speed of the gears 146, 146 is changed, a reciprocation speed of the shielding members 140a, 140b is changed, whereby the irradiation time of the light to the substrate pair Dx is controlled.

According to the method and apparatus for bonding optical disk substrates of the present invention, when a pair of substrates are to be bonded in the photosetting process to the adhesive layer, the deformation prevention means or devices efficiently prevents the warp or the like deformation of the substrates subsequent to the photosetting, thereby realizing an optical disk with a high degree of flatness.

In one aspect of the present invention, in the photosetting, warp deformation caused when the substrate pair finishes the photosetting operation can be offset by deforming the substrate pair tracing the height difference at the upper face of the stage because of a weight of the substrate pair, thereby realizing an optical disk with a high degree of flatness.

In an aspect of the present invention, the adhesive layer is set in the temporary setting step with a level of flexibility or deformability ensured, so that the adhesive layer does not move or is not deformed unexpectedly, but the thermal deformation of the substrate pair subsequent to the projection of the setting light can be absorbed in the cooling process. That is, the warp deformation of the substrates are determined by the temporary setting step. Thus, the division of the temporary setting step and the complete setting step allows the warp deformation of the substrates to be reduced, as compared with a case where only one setting step is carried out.

In an aspect of the present invention, a temperature of at least the front face-side substrate of the substrate pair is controlled thereby decreasing a temperature difference of both faces of the substrate pair. Thus, the difference of the thermal expansion amounts is lessened, so that the warp deformation is restricted.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for bonding optical disk substrates, said apparatus comprising:

a stage having a front face on which a substrate pair comprising optical disk substrates in a pair with a photosetting adhesive layer located in between is placed when the photosetting adhesive layer is to be photoset, said stage being structured to secure a height difference between a center of the substrate pair and an outer circumference of the substrate pair;

a light source operable to irradiate a setting light to the substrate pair, thereby to photoset the photosetting adhesive layer and to bond the pair of optical disk substrates, wherein said light source initially irradiates a lower quantity of the setting light then is required to completely set the photosetting adhesive layer, and then irradiates a required quantity of the setting light for completely setting the photosetting adhesive layer; and a shutter located to be between the substrate pair and said light source, said shutter being operable to control passage of the setting light so as to initially irradiate the lower quantity of the setting light than is required to completely set the photosetting adhesive layer, thereby temporarily setting the photosetting adhesive layer, and then irradiating the required quantity of setting light, thereby completely setting the photosetting adhesive layer, wherein said shutter comprises:
  a shielding member operable to prevent the setting light from passing;
  a light-passing space set at part of said shielding member, the light-passing space to permit the setting light to pass; and
  a shielding member driving device operable to selectively arrange the light-passing space at a position corresponding to the substrate pair and at a position shifted from the substrate pair.

2. An apparatus for bonding optical disk substrates, said apparatus comprising:

a stage having a front face on which a substrate pair comprising optical disk substrates in a pair with a photosetting adhesive layer located in between is placed when the photosetting adhesive layer is to be photoset, said stage being structured to secure a height difference between a center of the substrate pair and an outer circumference of the substrate pair;

a light source operable to irradiate a setting light to the substrate pair, thereby to photoset the photosetting adhesive layer and to bond the pair of optical disk substrates, wherein said light source initially irradiates a lower quantity of the setting light then is required to completely set the photosetting adhesive layer, and then irradiates a required quantity of the setting light for completely setting the photosetting adhesive layer; and a shutter located to be between the substrate pair and said light source, said shutter being operable to control passage of the setting light so as to initially irradiate the lower quantity of the setting light than is required to completely set the photosetting adhesive layer, thereby temporarily setting the photosetting adhesive layer, and then irradiating the required quantity of setting light, thereby completely setting the photosetting adhesive layer, wherein said shutter comprises:
- a pair of shielding members operable to prevent the setting light from passing, each of said pair of shielding members having a light-passing space to permit the setting light to pass opened at one side end opposite to a counterpart shielding member; and
- a shielding member driving device operable to selectively arrange the light-passing spaces at a position corresponding to the substrate pair and at a position shifted from the substrate pair, said shielding member driving device having an interlocking reciprocation device operable to interlockingly reciprocate said pair of shielding members in opposite directions to achieve the positions.

3. An apparatus for bonding optical disk substrates according to claim 1, further comprising a spacer detachably disposed to said stage at a center of said front face and projecting from said front face of said stage.

4. An apparatus for bonding optical disk substrates according to claim 2, further comprising a spacer detachably disposed to said stage at a center of said front face and projecting from said front face of said stage.

* * * * *